(12) United States Patent
Chart et al.

(10) Patent No.: US 10,574,532 B2
(45) Date of Patent: Feb. 25, 2020

(54) COMPONENT DETECTION AND MANAGEMENT USING RELATIONSHIPS

(71) Applicant: ScienceLogic, Inc., Reston, VA (US)

(72) Inventors: Richard Chart, Truro (GB); Matthew Luebke, Front Royal, VA (US); Karl Ginter, Beltsville, MD (US); Michael Bartman, Potomac, MD (US); Edward Adams Robie, Jr., Newport, NC (US)

(73) Assignee: ScienceLogic, Inc., Reston, VA (US)

( * ) Notice: Subject to any disclaimer, the term of this patent is extended or adjusted under 35 U.S.C. 154(b) by 32 days.

(21) Appl. No.: 15/833,236

(22) Filed: Dec. 6, 2017

(65) Prior Publication Data

US 2018/0109425 A1    Apr. 19, 2018

Related U.S. Application Data

(62) Division of application No. 14/672,743, filed on Mar. 30, 2015, now Pat. No. 9,912,546.

(60) Provisional application No. 61/971,875, filed on Mar. 28, 2014.

(51) Int. Cl.
    *G06F 15/16*     (2006.01)
    *H04L 12/24*     (2006.01)
    *H04L 12/26*     (2006.01)

(52) U.S. Cl.
    CPC .............. *H04L 41/12* (2013.01); *H04L 41/04* (2013.01); *H04L 43/08* (2013.01)

(58) Field of Classification Search
    CPC .......... H04L 41/12; H04L 41/04; H04L 43/08
    See application file for complete search history.

(56) References Cited

U.S. PATENT DOCUMENTS

| 5,960,439 | A  | * | 9/1999  | Hamner ............. H04L 41/0233 |
| 6,076,106 | A  | * | 6/2000  | Hamner ............. H04L 41/0233 |
|           |    |   |         |                         709/223 |
| 7,007,104 | B1 |   | 2/2006  | Lewis et al. |
| 7,032,212 | B2 |   | 4/2006  | Amir et al. |
| 7,139,823 | B2 | * | 11/2006 | Benfield ............. H04L 41/0213 |
|           |    |   |         |                         709/224 |
| 7,434,099 | B2 |   | 10/2008 | Flynn et al. |
| 7,523,128 | B1 |   | 4/2009  | Miller et al. |

(Continued)

*Primary Examiner* — Moustafa M Meky
(74) *Attorney, Agent, or Firm* — Nixon & Vanderhye, P.C.

(57) ABSTRACT

Correlation of component information provided by diverse detection and data collection methods is used to discover additional components and identify and record relationships between these and still other components. Each detection and data collection method can be individually useful to discover components, and to provide at least some information about one or more discovered components to identify at least one relationship between the discovered components. When the information and component discoveries of a first detection and data collection method are properly combined with those of a second detection and data collection method, there can be a synergistic effect that greatly improves the utility and efficiency of a relationship-based network management system by enabling automated discovery of additional components and identification of additional component relationships, by automatically merging diverse views of a single component into a coherent picture of that component, and by automated prediction of component state changes based on state changes in related components.

11 Claims, 13 Drawing Sheets

(56) References Cited

U.S. PATENT DOCUMENTS

| | | | |
|---|---|---|---|
| 7,657,620 B2* | 2/2010 | Benfield | H04L 41/0213 |
| | | | 709/223 |
| 7,804,939 B2 | 9/2010 | Taylor | |
| 7,870,238 B2 | 1/2011 | Pusateri et al. | |
| 8,543,611 B1 | 9/2013 | Mirtich et al. | |
| 9,451,949 B2* | 9/2016 | Gorek | A61B 17/06161 |
| 9,667,666 B2* | 5/2017 | Yang | H04L 12/2803 |
| 2006/0239428 A1 | 10/2006 | Taylor | |
| 2010/0142514 A1 | 6/2010 | Stein et al. | |
| 2010/0192225 A1 | 7/2010 | Ma et al. | |
| 2011/0154119 A1 | 6/2011 | Wang et al. | |
| 2013/0218974 A1 | 8/2013 | Cao et al. | |
| 2013/0290551 A1* | 10/2013 | Yang | H04L 12/2803 |
| | | | 709/228 |
| 2013/0318151 A1* | 11/2013 | Wu | H04L 12/2809 |
| | | | 709/203 |
| 2014/0201342 A1* | 7/2014 | Gimpl | G06F 15/177 |
| | | | 709/221 |
| 2017/0012936 A1* | 1/2017 | Wu | H04L 12/2809 |

* cited by examiner

Method 1 View

Method 2 View

COMPONENT DETECTION AND MANAGEMENT USING RELATIONSHIPS

1 CROSS REFERENCE TO RELATED U.S. PATENT APPLICATIONS

This application is a division of U.S. patent application Ser. No. 14/672,743 filed Mar. 30, 2015; which claims benefit of U.S. Provisional Patent Application No. 61/971,875 filed Mar. 28, 2014. These disclosures are incorporated herein in their entirety by reference.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2014-2015, ScienceLogic, Inc.

3 FIELD

The exemplary, illustrative technology herein relates to systems, software, and methods for detection, management, and monitoring of network components and sub-components, and for the identification, recording, and management of information describing the relationships between them.

The technology herein has applications in many areas of computer network management including for example monitoring, computer system upgrade planning, and asset tracking.

4 BACKGROUND AND SUMMARY

Modern computer networks often comprise numerous component types in large numbers. It is not uncommon for an organization to employ thousands of network-connected devices and their related components, including by way of non-limiting example, workstations, servers, tablets, and smart devices in both physical and virtual form. Network connected devices typically comprise one or more physical sub-components, such as data storage devices, network interfaces, cooling fans, power supplies. Network connected devices also typically comprise one or more virtualized hardware, software or other functional instances, such as iSCSI devices and the like. Software components comprise, for example and without limitation, operating systems, applications, database systems, web servers and web-based applications, security monitors, etc. that are separately configured and maintained and that may be installed or used in conjunction with one or more other components. Software components are typically built with and rely upon sub-components as well, such as dynamically loaded libraries, plug-in modules, and configuration registries. Relationship rules are used by some existing systems; however, such relationship rules are often built into the system and changes require re-programming in a way that is typically beyond the capabilities of most system operators.

Past work in managing such complex networks for enterprises has been done in the past. See for example, US20100094981 ("Dynamically Deployable Self Configuring Distributed Network Management System"), US20080228908 ("Management techniques for non-traditional network and information system topologies"), and US 20060092861 ("Self configuring network management system"), incorporated herein by reference. But as networks become increasingly complex, further improvements, techniques and approaches are possible and desirable.

5 BRIEF DESCRIPTION OF THE DRAWINGS

The features of example non-limiting embodiments will best be understood from the following detailed description of example non-limiting embodiments thereof selected for the purposes of illustration and shown in the accompanying drawings of which:

6 DETAILED DESCRIPTION OF NON-LIMITING EMBODIMENTS

6.1 Overview

Exemplary embodiments address the needs of a network management system (NMS) using a Relationship-based Network Management System (RNMS). Example non-limiting embodiments provide automated identification, directed discovery, and/or correlation of discovered component information. Identified relationship information is recorded for use in confirming component discovery and/or for improving data collection, discovery of additional components, identification of additional component relationships, management of systems and subsystems, and/or prediction of events related to changes affecting the state of components. These improvements can be used to reduce the opportunity for human error, speed root cause determination for events, and reduce the need for manual input or correlation of component information, thus enhancing the usefulness and efficiency of a RNMS.

Typical networks comprise a plurality of components of diverse types, both physical and logical/virtual hardware and software instances. Components can automatically be discovered using one or more detection methods. Information about the components is then collected by an RNMS using one or more data collection methods.

Figure 1:
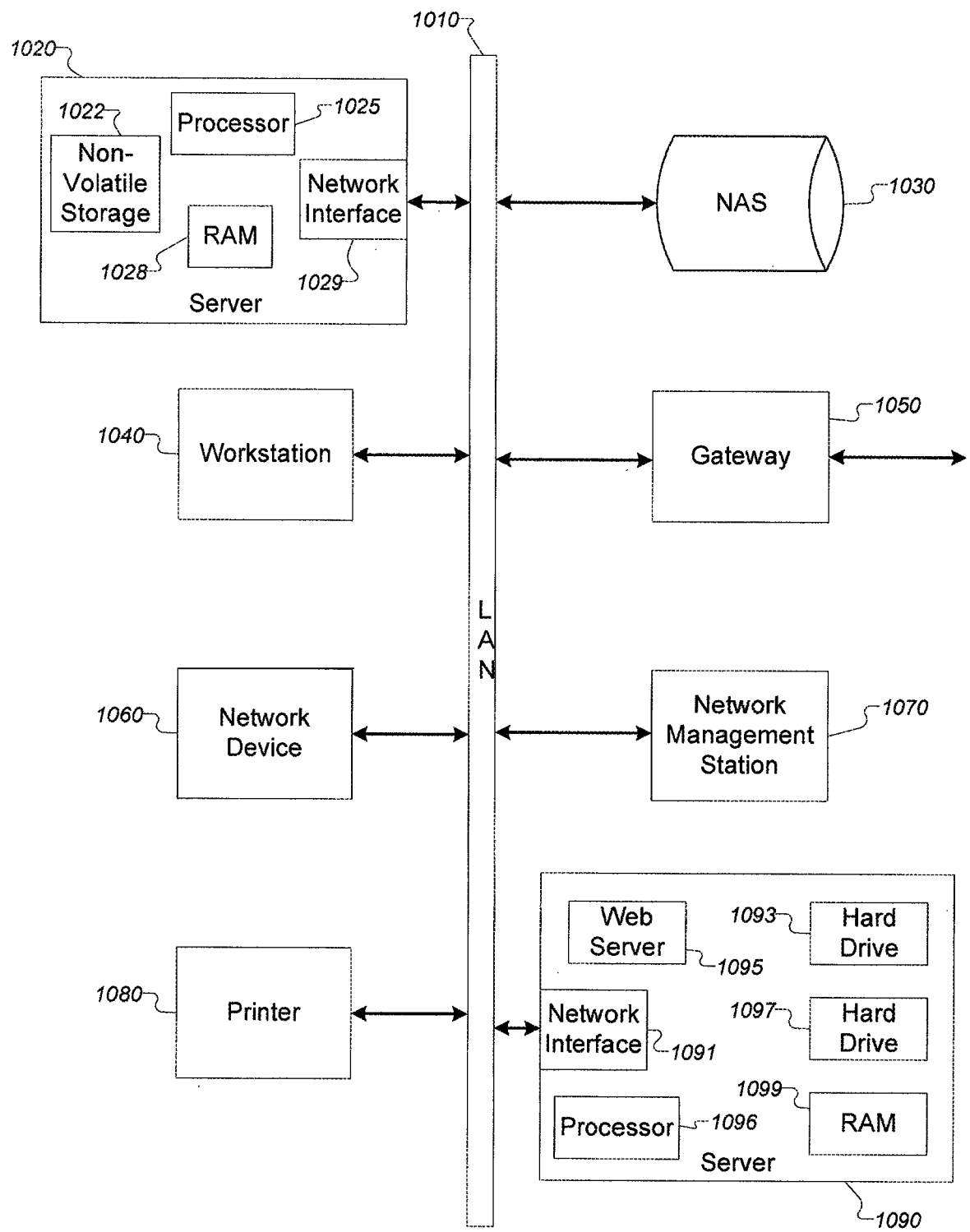
FIG. 1 depicts a diagram of an example network.

FIG. 1 shows an exemplary local area network (LAN) (1010), including several components that are typically connected to LANs. Such components can include, for example:

a. a server (1020) comprising sub-components such as a processor (1025), random access memory (RAM) (1028), a network interface (1029), and non-volatile storage (1022) (e.g. hard disk, optical disk, flash drive, etc.);
b. a workstation, laptop, or tablet computer (1040) including an internal processor or processors, an input interface, and output interface, semiconductor storage, magnetic storage, a wired and/or wireless network interface, and other portions;
c. a network attached device, such as an IP telephone, a network camera, or video playback system (1060);
d. a printer (1080); a network attached storage (NAS) device (1030);
e. a network gateway (1050) (e.g. a router);
f. a network management station (1070) (e.g. a SNMP client); and
g. a second network server device (1090) that comprises several sub-components such as a processor (1096), a network interface card (1091), a pair of hard drives (1093 & 1097), a RAM card (1099), and a web server software component (1095).

Component detection and data collection in the network management station (NMS) is accomplished using known detection, discovery, and data collection methods. Sometimes, a particular component is initially detected as a plurality of independent components and not recognized as being a single component, or as not being two parts of a single component. Rather, it will initially be seen to be a plurality of components by the NMS. This issue is commonly caused when the network architecture reports the same component with a plurality of network presences or points of presence. For example, certain network-connected devices may need or use multiple addresses or points of presence such as multiple IP addresses in IP-based networks. To a discovery process, such network-connected devices may appear to be multiple different devices rather than a single device with multiple points of presence.

When using a plurality of discovery and data collection methods, a single component may thus initially be erroneously recorded or displayed as a plurality of disparate components. If the network management system then proceeds to attempt to manage such uncorrelated points of presence as different components, the disparate component information provided by different discovery methods can result in an NMS's managing multiple components and produce multiple alerts and events when a component fails or encounters operational difficulties. In other cases, inconsistent management may be applied to the device based on its multiple network points of presence.

A network management system that lacks the capability to integrate information produced by diverse detection and data collection methods automatically, may sometimes be unable to collect and manage information about a single device from multiple collection methods, or where the multiple collection methods are indexed by different values. For example, an NMS may discover two network interfaces for a computer on a network, but not be able to make the association that the two interfaces are actually a single server or other network-connected device. In such circumstances, the NMS may not be able to provide automatically correlated statuses, alerts, and other useful information about the server or other network-connected device. This can sometime reduce efficiency and utility.

The example non-limiting technology herein provides methods and systems capable of automatically associating and correlating information derived through diverse detection and data collection methods to improve NMS efficiency and utility.

"Component," as used herein, refers to an instance of a network-connected or network-connectable device, and/or a uniquely identifiable portion of such a device, and/or discoverable software operating on such a device, and/or a uniquely identifiable portion of such a device, and/or a non-software entity (e.g. a user, organization, department, or records pertaining to them, etc). Examples of typical network-connected devices include, but are not limited to network routers and firewalls, LAN switches and hubs, servers, blade chassis, network gateways, wireless access points, workstations, laptops, tablets, network interface cards and any other computing or other device that can communicate with or via a network. Examples of "uniquely identifiable portions of a device" include for example a hard disk, a CPU, a RAID array, a network interface card, an uninterruptible power supply (UPS) or any other portion of a device that is identifiable independently of the overall device. In this context, "unique" does not have to be truly unique (i.e., one and only one exists in the universe) but is used in a more conventional sense as understood by those skilled in the art. Non-limiting examples of "software" include an operating system (OS), a web server, a database management system (DBMS), a virtual machine (VM), a hypervisor capable of running one or more VMs, a web page, a file system, a software function library, a software application, or any other functional block that is provided at least in part by code (including firmware) executed by one or more processors.

"Discovery" as used herein, refers to detecting the existence of a component and/or the collection of component attribute data that characterize a detected component. Discovery can involve a recursive or iterative process where initial discovery of a component is followed by discovery of additional information related to the component and/or to discovery of additional components until all discoverable components and information directly or indirectly related to the initially discovered component have been discovered, as described in Cordray et al, US 2006/0092861 A1, Link et al, US 2008/0228908 A1, and Cordray et al, US 2010/0094981 A1. The use of standardized interfaces and protocols such as Powershell, SQL, WMI, SNMP and RMON to further discover components is also anticipated.

One particularly useful non-limiting exemplary embodiment uses iterative discovery of components through the use of dynamic applications. Dynamic applications make use of a variety of detection and data collection methods to discover and investigate components (e.g. servers, network routers, mobile devices, desktop computers, laptop computers, tablets, virtual machines, network attached storage, hard drives, network interfaces, wireless access points, the software running on them, etc.), or their attributes (e.g. their configuration settings and current state, the interactions they are involved in with other components, etc.). The iterative nature of the process involves use of information discovered about a component by a first dynamic application for purposes of identifying and instantiating one or more second dynamic applications useful for discovering additional information about a component or its attributes. Information discovered by these dynamic applications can then be used to determine and record relationships between components.

Without regard to the particular method of discovery and data collection, in example non-limiting embodiments herein the component detection and data collection step(s) results in a set of detected components that are stored in the component storage of an RNMS along with one or more attributes about each component object. By processing the collected information using rules that define requirements for relationship identification, relationships between components can be automatically identified and actions taken based upon this identification.

Automatic detection and use of component relationship information improves RNMS functionality by providing any or all of the following non-limiting features and/or advantages:

- Provision of automated means for correlating disparate components and identifying relationships between components reduces inefficiencies and improves recognition of root causes for problem resolution.
- Reduction in use of detection and data collection methods that are not useful for a given network, without requiring manual configuration, by selecting detection and data collection methods appropriate for sets of previously detected components, and for sets of as yet undetected components that the first components typically have relationships with.
- Reduction of false "positive" and/or redundant problem reports.
- Identification of effects of failures based upon the relationship between related components and their statuses, alerts, and events.
- Prediction of or avoidance of side-effects from configuration changes that are planned or that occur spontaneously, such as from failures in related components.

Typical networks often support a plurality of instances of component types, e.g. multiple instances of a similar discoverable component. To identify each instance automatically, the RNMS uses one or more means to uniquely identify each component. In some exemplary implementations, the RNMS will discover a unique attribute provided by the device, such as a UUID or other globally unique ID, or other unique value (e.g. CPU ID register, hard drive serial number, network interface MAC address). In other exemplary implementations, the RNMS will generate a unique or non-unique value from one or more attributes obtained during discovery. A unique or non-unique ID, once discovered or assigned, may be written to and stored by the component in order to make future discoveries easier.

When components are identified with namespace-specific identifiers, additional information discovered about them can enable construction of a unique or non-unique ID. For example, a component discovered using SNMP and a component discovered using a VMware API that have identical MAC addresses cannot, in some example non-limiting embodiments, be determined to be the same device, since MAC addresses can be assigned as part of the configuration of some components. However, if both components are discovered to have the same route to a point on the public Internet, they can be identified as being the same device. A unique or non-unique ID can be constructed, for example, by having the route to the public Internet point included in the component identifier.

6.2 Exemplary Non-Limiting System

6.2.1 Architecture

Figure 2:
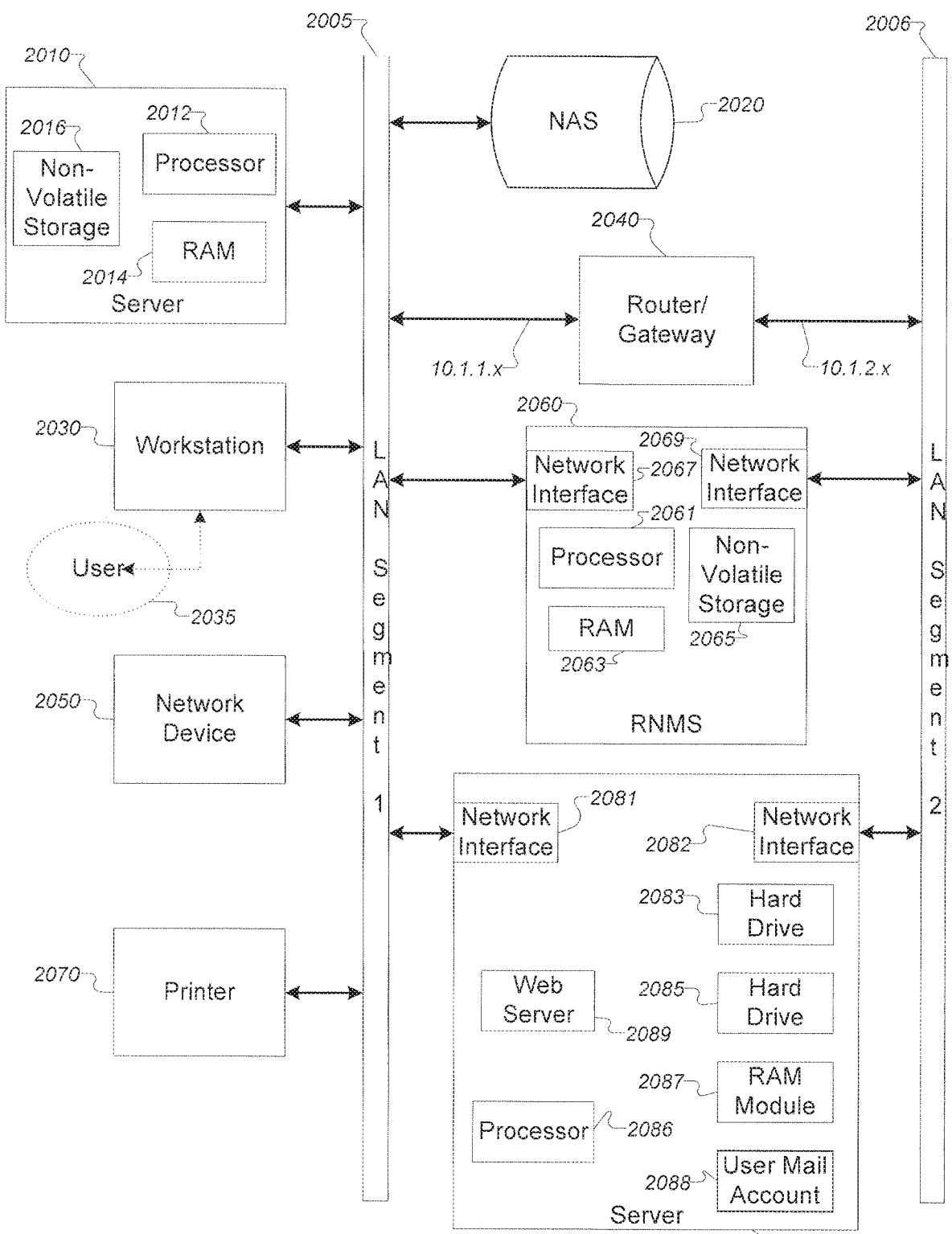
FIG. 2 depicts a diagram of an exemplary non-limiting local area network implementation.

An exemplary embodiment describes an RNMS deployed on the example non-limiting FIG. 1 local area network along with several other networked components, is shown in more detail in FIG. 2. A Network Monitoring and Management System (RNMS) is typically implemented on a networked device (2060) such as a network server, workstation, or Virtual Machine (VM). Each of these types of devices comprise at least a processor (2061), one or more memories (e.g. RAM, ROM, disk) (2063), and a network interface of known construction (2067). The network link may be wired, wireless, or in other ways known to those skilled in the art. The networked device can be dedicated entirely to supporting the RNMS and its operations in some exemplary embodiments, or the networked device can be shared with other systems and/or functions. The example non-limiting RNMS described herein has customized software and/or hardware components that implement methods for managing component relationships described herein. The RNMS software is installed into non-volatile storage (2065) suitable for storing executable RNMS instructions for execution by a RNMS device processor. Non-volatile storage is also useful for storing some or all component and relationship data discovered or used by an RNMS.

In other exemplary embodiments (not shown), the RNMS detection, discovery, and relationship management capabilities are implemented at least in part using special purpose hardware such as field-programmable gate arrays (FPGAs) or dedicated specialty processors. In some embodiments, the RNMS functions may be embedded in dedicated network equipment such as switches, routers, firewalls, and the like.

FIG. 2 further depicts several components that are connected to the LAN segments (2005, 2006), such as:

- a server (2010), workstation (2030); the workstation's user (2035);
- a network device (2050);
- a printer (2070);
- a network attached storage (NAS) device (2020);
- a network gateway (2040) that connects the first LAN segment (2005) to a second LAN segment (2006);
- a network management station (2060); and
- a network server device (2080) that comprises several sub-components such as network interface cards (2081 & 2082), a pair of hard drives (2083 & 2085), a processor (2086), a RAM card (2087), a user mail account (2088), and a web server software component (2089). A typical installation will comprise many other components (e.g. workstation hard drives and network interfaces, chassis fans, blade server chassis, operating system software, LAN switches, data files, etc.), which will be well known by those with skill in the art.

External search and download services may be used by the RNMS during operation. Two exemplary types of the external services include an external discovery application site that supports RNMS queries for additional discovery modules, and an external relationship rules site that support RNMS queries for additional relationship rules. These sites may be provided using web-based search and download services or other techniques.

An exemplary non-limiting embodiment may perform at least one of the following operations and/or makes use of the results of any of these operations that are carried out by other systems:

Detect components using one or more detection and discovery methods.

Collect data about detected components using one or more data collection methods.

Store information about components in one or more component stores.

Identify relationships between components represented in the store.

Determine relationship attributes for identified relationships.

Use identified component relationships to correlate data for specific instances of components as detected by disparate detection and data collection methods.

Merge or link data collected using disparate detection and data collection methods, that is associated with specific instances of components, for storage and/or display.

Use component relationships to discover additional components, to optimize component discovery methods, to identify additional relationships and/or relationship attributes, or to optimize collection of data from or about components.

Use component relationships to predict component state changes based on state changes of related components.

Figure 3:
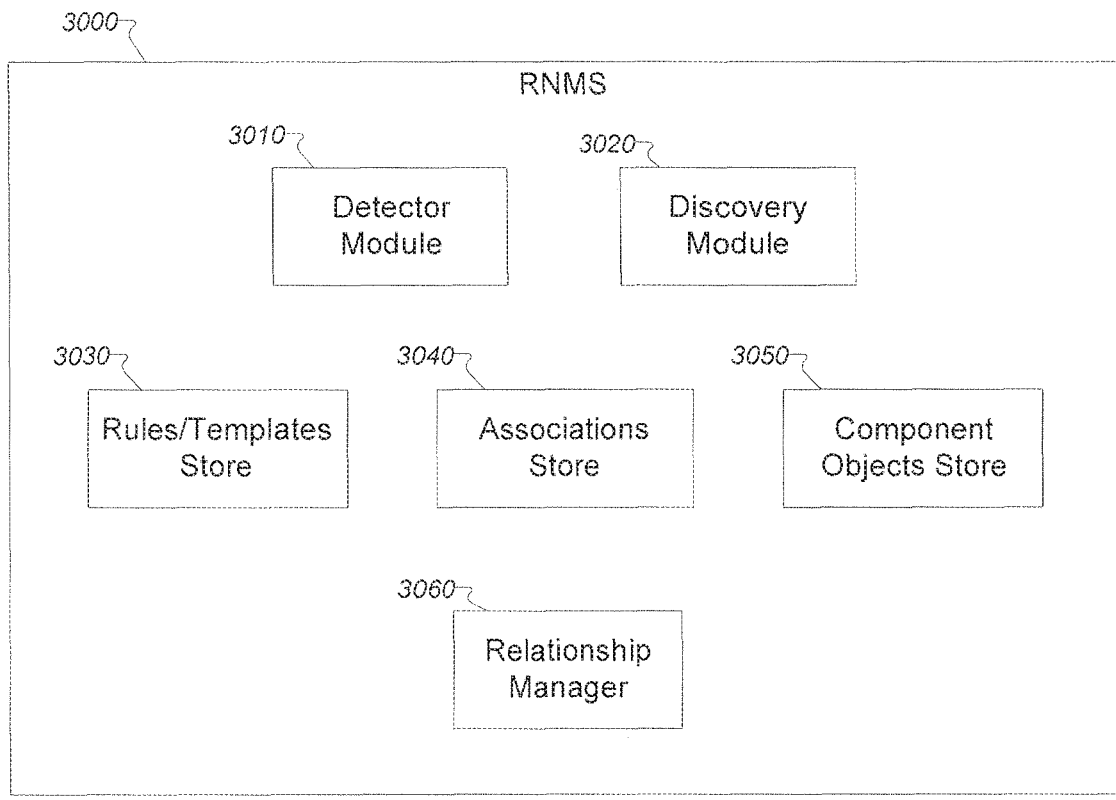
FIG. 3 depicts a diagram of an exemplary non-limiting RNMS implementation.

FIG. 3 illustrates an exemplary RNMS of the exemplary embodiment, including relationship management modules. The exemplary RNMS comprises one or more detector (3010) and discovery (3020) modules that detect network devices and store information about these devices in the component object store (3050) of the RNMS. The component object store module (3050) stores digital information about network devices and resides in a memory of the RNMS or in the memory of an attached subsystem. The exemplary RNMS further comprises a relationship rule store module (3030) and an association store module (3040). The relationship rule store module (3030) stores information about relationship rules used by the relationship manager module (3060). The association store module (3040) stores information about associations that have been discovered by the RNMS. The exemplary RNMS further comprises a relationship manager module (3060) that uses the relationship rules stored in the relationship rules store (3030) to manage (create, delete) associations relating to one or more component objects. The processing location for each of the RNMS modules can be a single central location, or a distributed processing arrangement. Whether centrally located or distributed, processing locations may have access to all collected information if a complete set of relationships is to be identified.

Exemplary store embodiments store component, rules, and/or relationship/association information in one or more storage locations, using one or more storage methods or technologies. Each store is preferably implemented using a database, but may be implemented using any technology that supports the persistent storage and retrieval of the stored information. For example, component and/or relationship information (in general, any information stored by an RNMS) can be stored on hard drives, in flash memory, on optical media, in a storage area network (SAN), or other storage devices using a Database Management System (DBMS), in one or more indexed files, in one or more sequential ("flat") files, or in a combination of these or other known arrangements. Component and relationship information can also be placed in volatile storage, such as random access memory (RAM), encoded into dynamically deployed applications, or sent between software components using shared memory, network communications, or other data exchange methods well understood by those with skill in the art. Component and relationship information can be stored in two or more storage locations simultaneously, such as in RAM and in a DBMS, or in a DBMS and in RAM attached to two diverse processors.

In an exemplary non-limiting embodiment, stores comprise a variety of data structures used to contain information collected from components, information about available or instantiated dynamic applications and their collection objects, discovered components, and identified relationships between components, or other information required, such as rules that define relationship requirements. The specific structure of each store is dependent upon the underlying storage mechanism and the nature of the RNMS deployment.

6.2.1.1 Component/Collection Objects

In one example non-limiting embodiment, collection objects are the representation of instances of specific component objects, and include collected information about the object. Thus, a component object describes the component, and collection objects describe information collected about the component. Collection objects comprise data and code for acquiring at least one attribute value from a specified component, and storing it at least temporarily.

Figure 4:
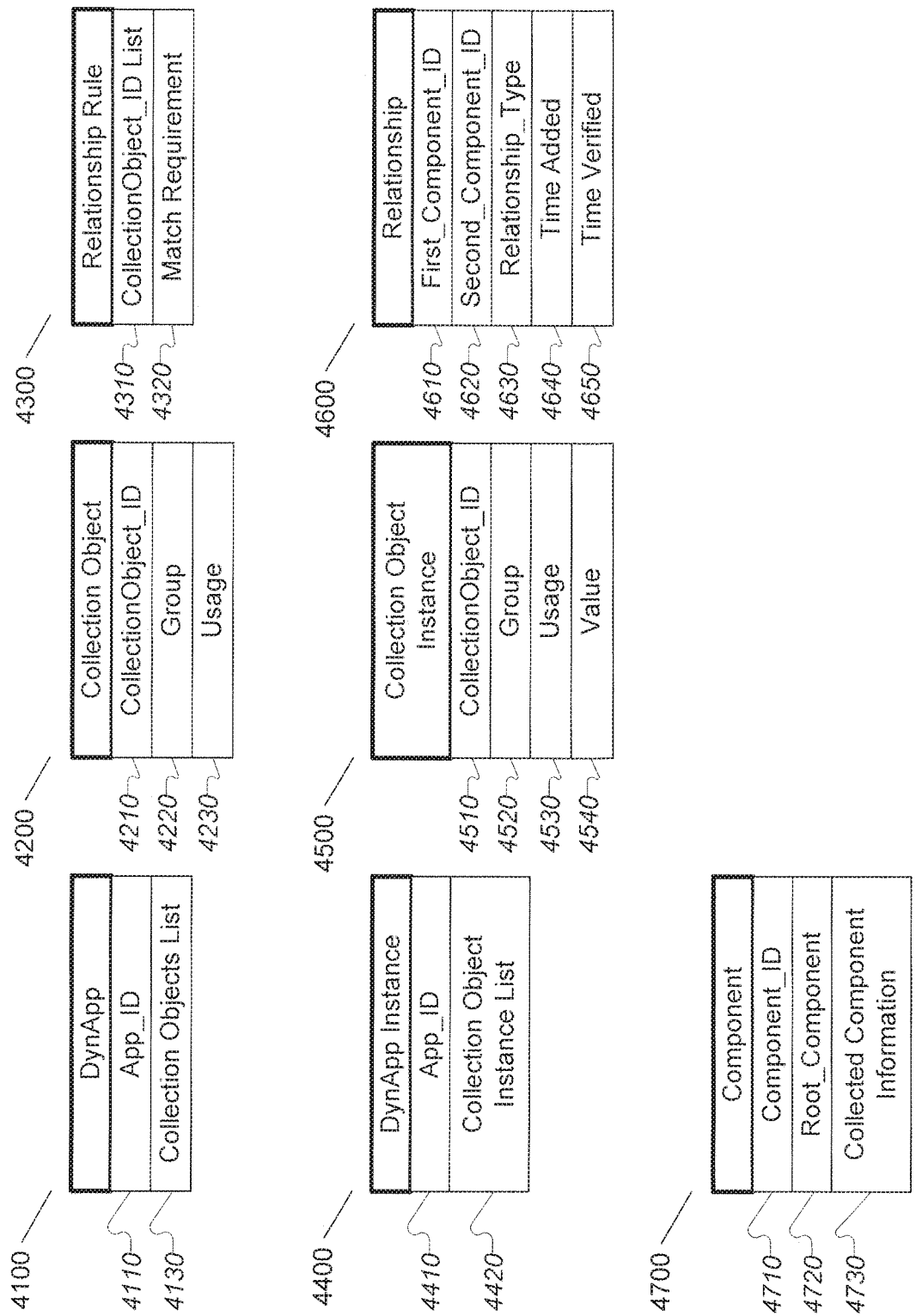
FIG. 4 is a diagram of exemplary embodiment data structures for recording relationship information, and for tracking discovery and data collection processes and their collected data.

FIG. 4 illustrates some exemplary, non-limited data structures of the RNMS. In FIG. 4, available dynamic applications can be tracked by use of the DynApp data structure (4100), which comprises an "App_ID" value (4110) and a list of one or more Collection Object IDs (4120). The DynApp data structure (4100) can comprise additional values in diverse embodiments, such as a dynamic application name, the location of the executable code of the dynamic application, the component types the dynamic application can discover or monitor, technologies it employs, etc.

The Collection Object data structure (4200) comprises a "CollectionObject_ID" (4210) by which the collection object can be referred to, such as in DynApp Collection Objects Lists (4130), a "Group" value (4220) and a "Usage" value (4230). The "Group" value (4220) specifies how the attribute value collected by a specified collection object is related to those collected by other collection objects. The "Usage" value (4230) specifies how the collection object is used. For example, it may be used to identify whether the collection object represents a group index, specifies a UID or unique ID, or serves no special purpose. The Collection Object data structure (4200) can comprise additional values, such as the location of executable code used to acquire component attributes, a collection object name, etc.

Potential relationships between components are described by rules that specify requirements that two components must meet to be identified as having a specific relationship with each other. The Relationship Rule data structure (4300) can be used to contain such rules and related information. A "CollectionObject_ID List (4310) specifies the collection objects, by CollectionObject_ID (4210), that provide information used by a given relationship rule. The "Match Requirement" value (4320) specifies how the collected information is used for determination of whether components are in the specified relationship. This value can consist of one or more enumerated types that specify a set of pre-defined relationship rules, a link to one or more functions or other code useful for determination of whether a relationship exists between two components, an XML description of relationship requirements, or other value or values.

When a dynamic application is instantiated, a DynAppInstance (4400) data structure is created to keep track of it. A plurality of instances of a given dynamic application can be in existence at the same time in some exemplary embodiments, and a DynAppInstance (4400) data structure is created for each of them. The DynAppInstance (4400) data structure comprises an "App_ID" value (4410) that specifies the dynamic application as found in the dynamic application's DynApp data structure (4110), and a Collection Object Instance List element (4420) that contains references to Collection Object Instance (4500) data structures. The DynApp Instance data structure (4400) can comprise additional values, such as the location of executable code for the dynamic application, authorization information used in accessing component attributes, etc.

Collection Object Instance data structures (4500) are used to keep track of specific instances of collection objects. Each Collection Object Instance data structure (4500) contains values a CollectionObject_ID (4510) that specifies the Collection Object (4200) from which this instance was derived, and "Group" (4520) and "Usage" (4530) as specified in the collection object's Collection Object data structure (4200). The Collection Object Instance data structure (4500) additionally comprises at least one "Value" data field (4540) which is used to hold the attribute value the collection object instance collects, until it can be sent for processing and storage. The Collection Object Instance data structure (4500) can comprise additional elements and values, such as the location of executable code used to acquire component attributes, a collection object name, or other values, which are not shown, but will be well understood by those with skill in the art.

Relationship data structures (4600) contain information about identified component relationships, such as the "First_Component_ID" (4610) and "Second_Component_ID" (4620) components in the relationship, the "Relationship_Type" (4630) of the relationship (e.g. hierarchical, peer-to-peer, "self", etc.), the "Time Added" (4640) (i.e. the time the Relationship data structure (4600) was created), and the "Time Verified" (4650) (i.e. the most recent time the relationship has been recognized as existing).

When a component is detected, a Component data structure (4700) (e.g. a component object) is created to keep track of it. The Component data structure (4700) comprises a "Component_ID" value (4710) (i.e. a unique identifier for the detected component), a "Root_Component" value (4720) (i.e. the root component of the component being tracked in the data structure instance), and "Collected Component Information" (4730) (i.e. any information collected about the component). The Component data structure (4700) can comprise additional elements and values in some exemplary embodiments, such as the App_ID (4110) of the dynamic application that discovered the component, the time that the component was discovered or last seen, the technology used to detect the component, etc. as will be apparent to those with skill in the art.

6.2.1.2 Relationship Rules

Relationship rules define the requirements to establish and maintain a relationship between two component objects, and further define the structure and information that is provided as part of the defined relationship. Relationship rules are stored as distinct structures within the rule store. Rules in the rule store may be modified and extended during the operation of the RNMS, without restarting or reloading the RNMS. In some exemplary embodiments, the rules may be dynamically added to the rule store on the basis of the discovery of a particular component, or may be dynamically added to the rule store on the basis of a newly formed association. Relationship rules may be encoded in a form most useful for storage or evaluation, depending upon implementation requirements. Particularly advantageous forms of encoding rules include using a query language (e.g. SQL), or XML or XML derived queries such as)(Path.

Example Non-Limiting relationship rules can comprises any or all of the following types of specifications:
  First component attributes name/value(s) to match
  Second component attributes name/value(s) to match
  (optional) third—nth component attributes name/value(s) to match
  Relationship requirements
  Relationship action
  Relationship trigger
  Relationship template In an embodiment, relationship rules specify attributes of at least a first component, a second component, and requirements that are to be met for a relationship to exist between a first component having specified attributes and a second component having specified attributes. Thus, the first, second, and third through n-th component attribute name/value(s) provide matching terms used by the RNMS to identify component objects recorded in the component object store that may have a relationship.

Relationship rule requirements can be specified in various ways in diverse exemplary embodiments, such as Boolean expressions that evaluate to true (i.e. "relationship exists") or false (i.e. "relationship does not exist"), name/value pairs (where the named characteristic is required to have the specified value for a relationship to exist), functions returning at least a Boolean value that specifies relationship existence or non-existence, expressions and/or functions that evaluate to a probability value for a relationship to exist, or any combination of these or other specification methods.

Relationship rules in at least some exemplary embodiments comprise parameters specifying component attributes, e.g. identification specifications for specific instances of component types, component locations, component configuration specifications, other component relationships, or any other component characteristics or relationship attributes that can be collected in the component detection and data collection step or determined from such data. For example, "(first component port 80 is connected to any second component port) AND (first component port 80 initial connection string contains the character string "Apache") AND (second component is a workstation type component)". Such a relationship requirement might be part of a rule that establishes an "open web browser session" relationship. Performance and state data can also be useful in determining that two components have a relationship. For example, if the octets sent out on a first network interface equal the octets received on a second network interface over a particular interval of time, it is very likely that the two interfaces have a relationship (i.e. they are connected).

Sets of relationship rules can be collected and distributed for use by RNMSs or for other purposes. In alternative embodiments that use code design to implement rules to define relationships as described above, the code that embodies the relationship rules, such as dynamically deployed applications, can be distributed for use as needed. This enables identification of relationships involving new component types as they are put into service or discovered, as well as identification of new relationships or relationship types. Distribution of relationship rules, or dynamically deployed applications that implement them, can be done proactively in anticipation of a need for them, on an as-needed basis, or as new rules become available.

In some exemplary embodiments, rules or dynamically deployed applications are grouped into sets based on useful similarities, such as, but not limited to, describing the relationships that are possible for one or more specific component types, or for specific sets of component types, or for use with specific networking technologies. In some exemplary embodiments, one or more relationship rules or dynamically deployed application sets can be supplied by or with the components that are involved in the relationships defined by one or more of the rules or rule sets. In alternative exemplary embodiments, relationship rules are provided separately from the RNMS itself, and can be added, deleted, modified, or replaced in the rules store as required without alteration of the RNMS. In some of these alternative exemplary embodiments, relationship rules are adjusted based on the component types discovered. For example, if a network router is discovered, relationship rules relevant to network routers can be added to or automatically acquired by the RNMS to enable the relationship-based functionality described herein with respect to the discovered network router. In still other alternative exemplary embodiments, relationship rules are encoded into dynamically deployed applications useful for identifying component relationships.

Relationship actions describe the actions that the relationship manager should take when identifying a new relationship. One or more actions may be defined (for example, delete an old relationship and insert a new one). Example non-limiting actions include:

Insert relationship into relationship store
Delete relationship from relationship store
Verify relationship
Check external stores for additional rules/discovery modules
Execute discovery In some exemplary embodiments, rules that define known relationship patterns (e.g. web servers often have relationships with database management systems (DMBMs)) can specify as actions discovery applications capable of recognizing instances of said relationship patterns. Such rules (and their specified discovery applications) are useful for detecting the existence of a second component that has a relationship with a first component based on detection of the existence of the first component. Relationship triggers define when the relationship rule is evaluated. Example triggers include: on demand, upon adding new component object, upon deletion of component object, upon change of status of component. Multiple triggers may be defined, and conditions upon which the triggers are tested.

Relationship rules also define the relationship information that is stored in the relationship store when an insert relationship action is performed. This definition is called a relationship template.

In some exemplary embodiments, component relationship rules determine which of a component relationship's attributes must match for the components to be in a relationship. If any rule fails to match, the components are considered not related and any resulting association is removed. In alternative exemplary embodiments, rules are used to specify what level of match is required, or which rules are essential and which rules are optional, or what weight is to be assigned to each matching rule and what threshold is required for a component relationship to be determined. In some exemplary embodiments, rules can comprise required or disallowed component relationships or relationship types.

In some exemplary embodiments, relationship rules are specified and enforced by the detection and discovery code, either when a relationship is recognized by the detection and/or discovery code, or upon insertion, deletion, or status change of a component object.

Example PDL for logic performed when a component object is discovered or deleted is shown below. This logic is performed by the processor of the RNMS when component object is added or deleted from a store of the RNMS:

```
On component discovery
//     find all components that may match
FOREACH rules that match discovered component attributes DO
    IF association exists for current component that conforms to current
    rule
        THEN   // association found, is it current rule?
            IF current_rule age is newer than association age
                THEN      // adjust current association if needed
                    Adjust association attributes to be consistent with rule
                    Set association age to now.
                    Throw association changed event
                    Continue
            FI
        FI
        // association not found.
        Search for match endpoints under current rule
        IF match endpoints found
            THEN
                Add association for current rule
                Perform any additional actions specified in rule
                Continue
            FI
        // no match endpoint found, do we interatively discover one?
        IF discovery action found in rule
            THEN
                queue discovery for expected missing endpoint
            FI
ENDDO
On component delete
FOREACH association with component as endpoint DO
    DELETE association
ENDDO
```

6.2.1.3 Associations

Associations are the stored result of a relationship rule's being satisfied. An association specifies the association between and among two or more component objects represented in the component object store.

Associations include the type of association and the nature of the associations dependency, as well as any actions that must be taken by the RNMS if one or more of the components change state.

Type of association
Hierarchical
Peer
Self

One particular type of relationship is the "self" relationship, where two apparently diverse components are actually the same component. A single component appearing to be two diverse components can occur as a result of two separate views of a single component being produced by diverse detection or data collection methods. Identification of a "self" relationship between two such components is useful for correlating the separate views of the single component. In some exemplary embodiments correlated data is merged into one or more records for a single component. In alternative exemplary embodiments correlated data is maintained as separate records for each component view, and these are linked via the identified relationship as required for display or other use.

Components may have symmetrical or asymmetric relationship associations (i.e. if a first component has a relationship with a second component, then the second component may or may not also have a relationship with the first component). Thus, in the non-limiting example, associations between components may not follow the associative property of if A is associated with B then B is associated with A. However, in many cases, if A is associated with B then B in turn will in fact be associated with A, although the type of association may not necessarily be the same. For example, the two relationships may or may not have the same attributes, e.g. one may be a dependent relationship while the other is not a dependent relationship (see below for a description of relationship attributes). A first component can simultaneously or sequentially be in a plurality of relationships with a second component. A first component can simultaneously or sequentially be in a plurality of relationships with a third component while simultaneously being in one or more relationships with a second component.

Relationship descriptions comprise zero or more relationship attributes. In some exemplary embodiments, the permitted attributes for a given relationship are defined by the relationship type. In some alternative exemplary embodiments, attributes for relationships can be added, modified, and/or removed when the relationship is identified and a relationship record is created. In yet other alternative exemplary embodiments, attributes for relationships can be added, modified, and/or removed at one or more times after the relationship is identified, in which case the relationship record is adjusted accordingly. Attributes of a first relationship type can be different from attributes of a second relationship type. For example, a hierarchical relationship type may have an attribute "parent" while a peer-to-peer relationship type would not have a "parent" attribute.

Relationship attribute values are established for a given relationship at the time the relationship is identified and/or at one or more later times as additional information about the relationship or the related components is collected. In some exemplary embodiments, relationship attribute values are determined by relationship rules. Relationship attributes can be used for various purposes, such as to flexibly associate relationships with roles for the relationship (e.g. predecessor/successor, physical/virtual, superior/inferior, etc.), characteristics of the relationship (e.g. dependent/independent, long duration/short duration, software/hardware, remote/co-located, a display name for the relationship, etc.), or for other purposes. The values of attributes for a first relationship of a given type can be different from the values or attributes for a second relationship of the same type. For example, in a first hierarchical relationship, a "dependency" attribute can have a value of "yes," while in a second hierarchical relationship, a "dependency" attribute can have a value of "no."

In some exemplary embodiments, attribute values can be constrained. Constraints can be that the attribute values must be chosen from specified sets of possible values, be chosen from a specified range of values, chosen so as to be greater than or less than a specified value or values, must match a specified regular expression, must return a particular value when given to a specified function as an argument, or be constrained using any other known methods.

Component relationships may be classified based upon their "directness," which is related to how much effect a change in a first component will have upon a second component. This classification may be stored as an attribute of the relationship association, and is used by the RNMS to determine, for example, the effect of a status change in a first component upon a second component. Examples include "direct" relationships and "indirect" relationships. A first component interacting directly with a second component has a direct relationship with the second component. A third component that has a direct relationship with a fourth component, the fourth component having a direct relationship with a fifth component, can have an indirect relationship with the fifth component. For example, a third component that opens a network connection to a fifth component through a network gateway component can be in a direct relationship with the gateway component, and an indirect relationship with the fifth component. Such a relationship between the third and fifth components may or may not exist depending on the requirements for such relationships. In at least some exemplary embodiments, whether a relationship is direct or indirect can be recorded as an attribute of the relationship. Indirect relationships can be used in determining causal linkages for events, and for predicting the effects of component changes.

An example PDL of the logic performed by the processor of the RNMS upon receiving notice of a status change to a component that has relationship associations established for it is provided below.

```
FOREACH association with component as endpoint DO
    IF association attributes indicate effect of status update
    THEN
        Update effected 2nd component status (and time)
    FI
ENDDO
```

Relationship attributes in at least some exemplary embodiments can be used to group relationships for use in relationship rule specifications, for use in associating relationships for display, or for other purposes. To group two or more relationships, a relationship attribute, for example "Relationship Group", is created. Relationships that are to be grouped together are assigned Relationship Group values that indicate their group membership. For example, a first and a second component in a peer-to-peer relationship that have an active network link between them can have a Relationship Group value of "net link" assigned to their relationship. A third and fourth component in a hierarchical relationship that have an active network link between them can also have a Relationship Group value of "net link" assigned to their relationship. The attribute value "net link" can be useful for selecting components that are linked via a network for display, or for determination of dependency between each of them and network infrastructure components, such as routers. A fifth and sixth component that are in a hierarchical relationship where a failure of one will result in a failure of the other can have a Relationship Group value of "dependent." Alternatively, a separate attribute can be established and used for grouping component relationships based on dependency, for example an attribute named "Dependent" that can be assigned values of "yes," "no," or "unknown." These and other uses of a capability for grouping relationships using relationship attributes will be apparent to those with skill in the art.

Relationship attributes useful for grouping relationships are defined as needed by an RNMS in some exemplary embodiments at design time. Alternative exemplary embodiments support defining attributes at RNMS installation time, such as by use of configuration settings. Yet other alternative exemplary embodiments support defining relationship attributes manually or automatically while an RNMS is operating. For example, some exemplary embodiments can have a number of pre-defined relationship attributes, support definition of relationships as part of RNMS installation or configuration, and also support defining relationship attributes as required while an RNMS is operating.

Some examples of possible relationship groups are shown in Table 1.

TABLE 1

| Relationship Group | Description |
| --- | --- |
| Network connected device/Service | Services executing on network connected device processors |
| Client/Server | Clients requesting services from servers |
| Component/Sub-Component | Components with sub-components |
| VMWare Datastore/NetApp Volume | NetApp Volumes located in VMWare Datastores |
| VMWare Datastore/NetApp LUN | NetApp Logical Unit Numbers located in VMWare Datastores |
| Network connected device Storage Volume/NetApp LUN | Network-connected device Storage Volumes located on NetApp Logical Unit Numbers |
| Cisco UCS Service Profile/device | Service Profiles describing a network connected device |
| NetApp LUN/UCS Service Profile | UCS Service Profiles for NetApp Logical Unit Numbers |

6.2.2 Component Relationship Management

The illustrative RNMS scans the component store, matching attributes of stored component objects gathered during the detection and discovery processes implemented by the RNMS. The attributes of these objects are compared using relationship rules, and if a match is found, an association is entered into the relationship data store as indicated by the relationship rule. If specified by the relationship rule creating the association (in the actions portion of the rule), the RNMS may check additional rules, or even take actions to search for additional rules in external rules download sites. These scans may be performed by the RNMS on a periodic basis, or may be performed after being triggered by an event. In some embodiments, the insertion, modification, or deletion of a component in the RNMS stores may cause a scan to be performed.

A PDL for managing component relationship status on a timed basis is listed below. Code implementing this PDF is executed when a periodic timer event is processed.

```
FOREACH component whose status has not changed in the last
/age_threshold_time/or that has changed since
/recent_threshold_time/ DO
  FOREACH rules that match selected component attributes DO
    IF association exists for current component that conforms to current
    rule
      THEN   // association found, is it current rule?
        IF current_rule age is newer than association age
          THEN        // adjust current association if needed
            Adjust association attributes to be consistent with rule
            Set association age to now.
            Throw association changed event
            Continue
        FI
    FI
        // association not found.
    Search for match endpoints under current rule
    IF match endpoints found
      THEN
        Add association for current rule
    FI
  ENDDO
ENDDO
```

6.2.2.1 Identification of Component Relationships

Figure 5:
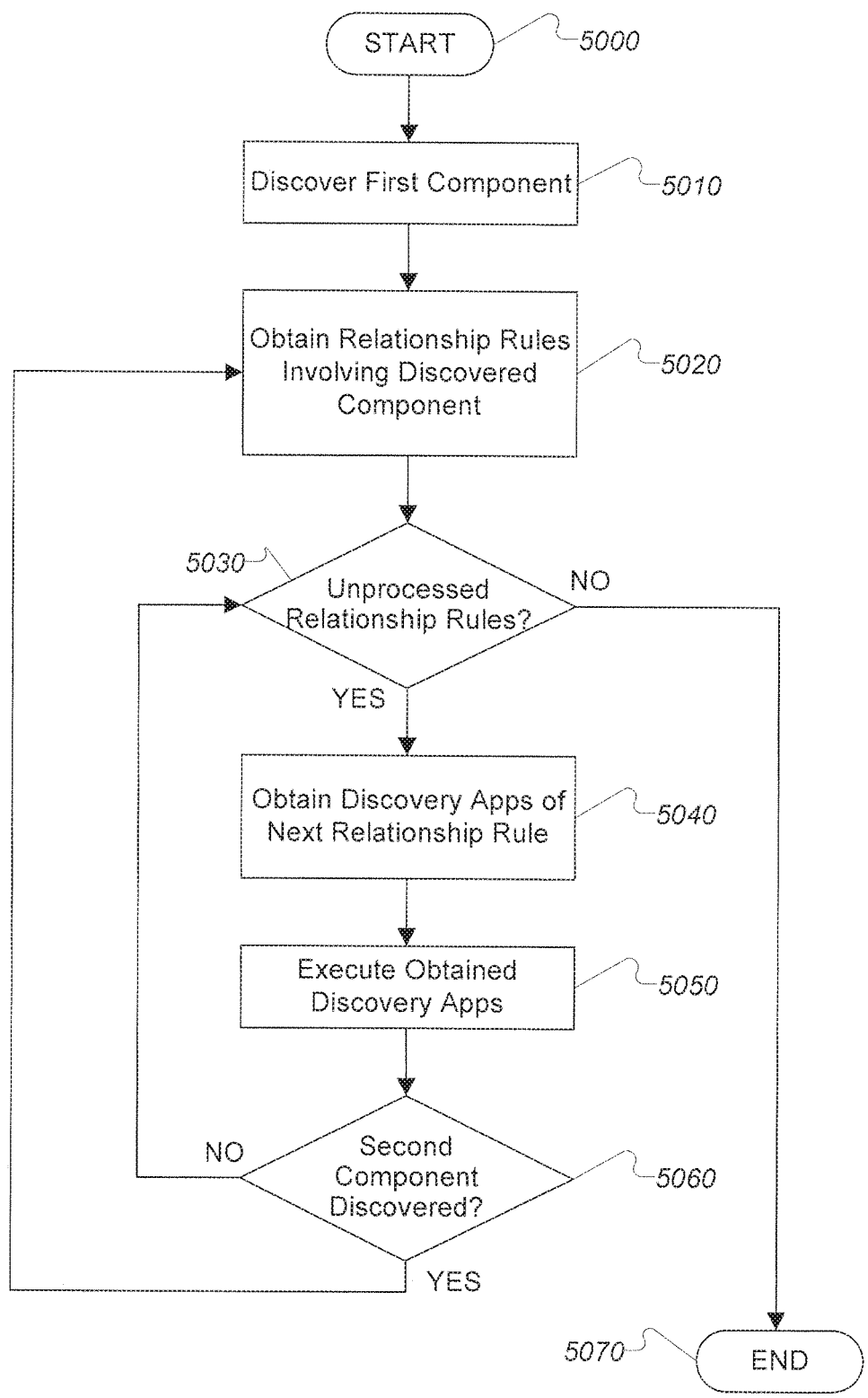
FIG. 5 is a flowchart of an exemplary process for component discovery using relationship rules.

The process flowchart illustrated in FIG. 5 illustrates the discovery and identification of relationships between components in an RNMS.

The process starts (5000) with the discovery of a first component (5010) and collection of data about it. A set of matching relationship rules is then identified and, where necessary, obtained, that specify relationships involving components of the first component's type (5020). Each rule in the identified set is then processed. If there are no unprocessed rules (5030) the process is complete (5070) until the discovery of another first component (5010). If there are unprocessed rules (5030), the discovery applications of an unprocessed relationship rule are identified, and where necessary, obtained (5040). The discovery applications are executed (5050) and attempt to discover a component that is of a type specified in the relationship rule. Discovery applications can be executed one at a time, in parallel, or in any combination. Discovery applications can use information from the relationship rule to aid their discovery. For example, if a relationship rule specifies that web servers typically have relationships with DBMSes using network connections on port 3080 of the DBMS system, and the relationship rule specifies a port scanning application as a discovery application, when a web server has been discovered, the web server/DBMS relationship rule can be used to select the port scanning discovery application, which then uses the information from the relationship rule to determine that port 3080 should be checked for a DBMS on each device the web server component's underlying server has a connection to. If a connection to a second component is to port 3080 of that component, a DBMS component may have been identified and can trigger additional discovery. If a second component is discovered (5060), relationship rules for its type are identified (5020) and the process continues. If a second component is not discovered (5060), a check is made for more unprocessed relationship rules (5030). If there are none, the process is complete (5070), otherwise the process continues with identification and execution of another relationship rules specified discovery application (5040) and the process continues.

Figure 6:
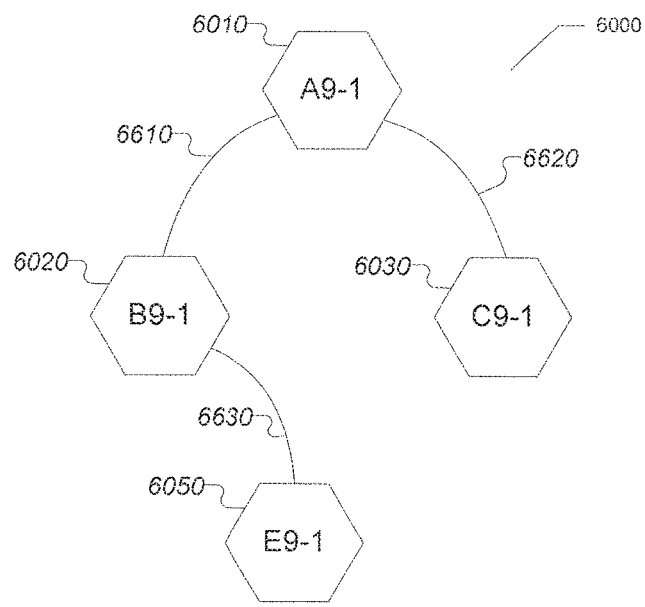
FIG. 6 is a pair of diagrams depicting a first and a second view of a set of components and some relationships between them.
Figure 6:
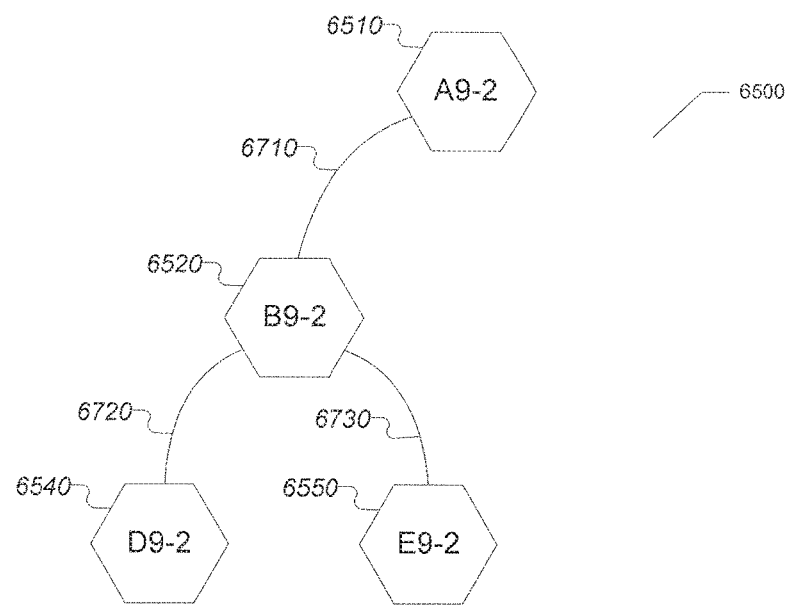

FIG. 6 shows an example of the results of detection, data collection, and relationship identification using a first detection and data collection method (6000) and a second detection and data collection method (6500). The first detection and data collection method (6000) has discovered components A9-1 (6010), B9-1 (6020), C9-1 (6030), and E9-1 (6050). The second detection and data collection method (6500) has discovered components A9-2 (6510), B9-2 (6520), D9-2 (6540), and E9-2 (6550). Relationship rules have been applied to the components and the data collected from or about them, and a number of component inter-relationships have been identified (6610-6630 & 6710-6730). By construction of graphs of the relationships between components for each detection and data collection method, where components are the graph's nodes and relationships are the graph's edges, it is possible to detect a sub-graph in the first detection and data collection method's component relationship graph (6100) that matches a sub-graph in the second detection and data collection method component relationship graph (6200) and thus recognize that components A9-1 (6010), B9-1 (6020), and E9-1 (6050) detected using the first detection and data collection method are the same components as components A9-2 (6510), B9-2 (6520), and E9-2 (6550) discovered using the second detection and data collection method.

6.2.2.2 Component De-Duplication

Figure 7:
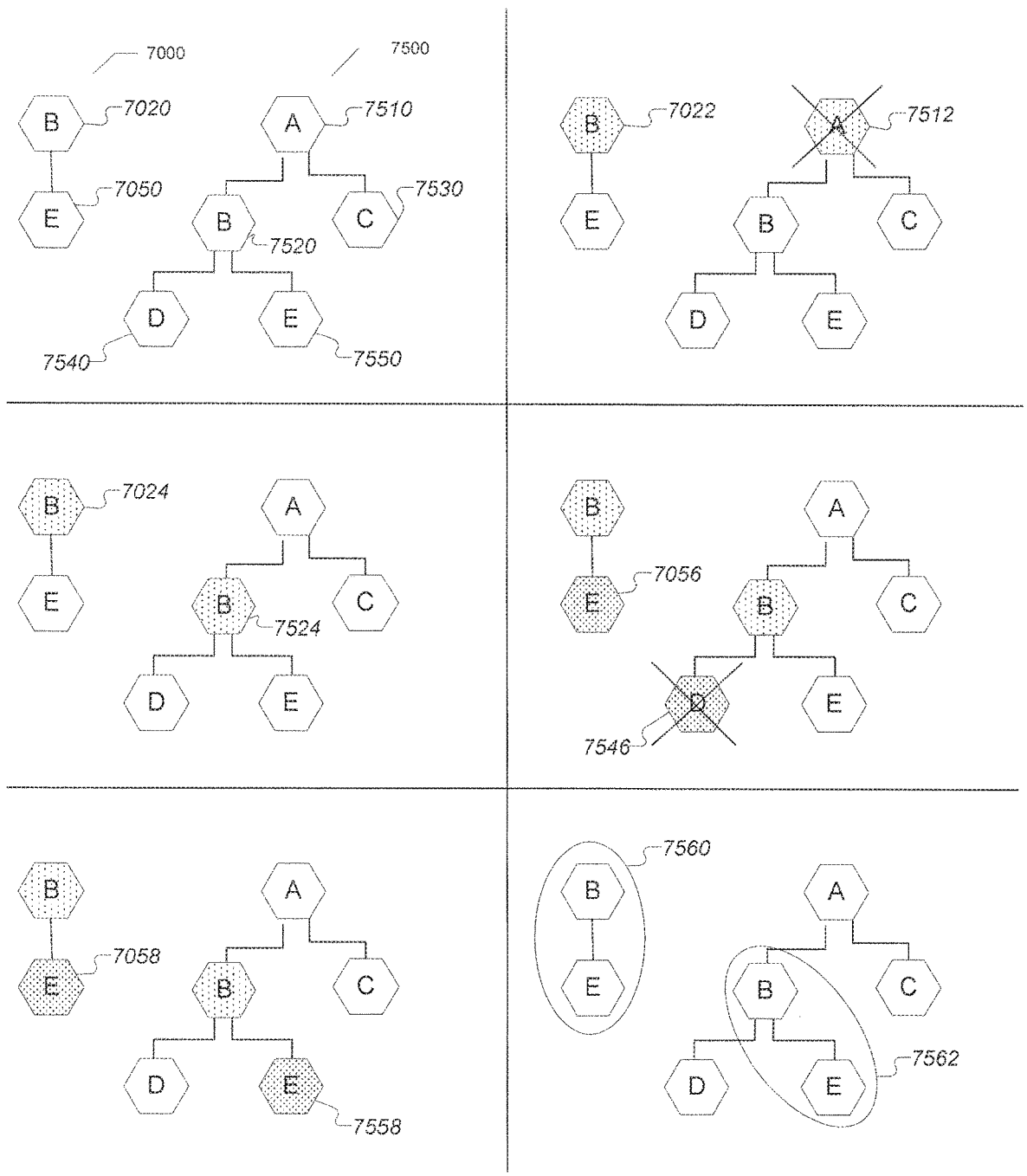
FIG. 7 is a diagram depicting stages in the process of finding a sub-graph in a graph.

Detection of a particular sub-graph within a graph can be done by well-known graph methods, such as a brute-force tree-search enumeration procedure that checks each node of a target graph for membership in the sub-graph of interest, and when a match is found, recursively checks nodes connected to the matched node to see if they exist in both the target and sub-graph. If the entire sub-graph is matched, the sub-graph has been found in the target graph. FIG. 7 shows a sequence of steps involved in performing this method for an exemplary target graph (7500) and sub-graph (7000). The target graph (7500) is made up of 5 nodes, A (7510), B (7520), C (7530), D (7540), and E (7550). The sub-graph is made up of 2 nodes, B (7020) and E (7050). To determine if the sub-graph (7000) is present in the target graph (7500), the process begins by comparing the first node of the sub-graph (7022) with the first node of the target graph (7512), and finds that there is no match so it moves on to comparing the first node of the sub-graph (9024) to the second node of the target graph (7524), and finds a match so it then checks the related node of the sub-graph (7056) to the first related node in the target graph (7546), which does not match. It then moves on to the second related node in the target graph (7558) and compares this to the related node in the sub-graph (7058), which does match. Since all of the nodes of the sub-graph (7560) have been matched, in the same relationship to each other, to nodes in the target graph (7562), the sub-graph has been found in the target graph.

Matching of nodes can be performed by comparing data collected about a first node to data collected about a second node as described above. Some exemplary embodiments require that there be collected data in common between the two nodes; for example, a public IP network address, a node name, or a file name (for application software). Because such data will not always exist in common in the data collected by diverse detection and data collection methods, other exemplary embodiments do not require an exact match of this type, and rules are used to specify matching requirements sufficient to conclude that two nodes are one and the same. For example, if a first detection and data collection method determines that a node has a specific network address, and a second detection and data collection method determines that a node has a specific domain name system (DNS) name, and that the DNS name can be translated by a DNS server into the specific network address, a relationship rule can be used to determine that in that case the two nodes are one and the same. In yet other exemplary embodiments, information collected by a third detection and data collection method can be used in deciding that two nodes are one and the same. For example, a first detection and data collection method (e.g. packet sniffing) determines that a node has a specific network address, a second detection and data collection method (e.g. an agent using an OS API function) determines that a node has a specific MAC address, and a third detection and data collection method (e.g. an address resolution protocol (ARP) request) determines that the specific MAC address is associated with the specific network address.

In exemplary embodiments, each possible sub-graph of a first detection and data collection method's component relationship graph is checked against the second detection and data collection method's component relationship graph. Using a brute-force sub-graph detection method such as the tree-search enumeration procedure will work, but is very compute-intensive, and more efficient methods may be preferable, such as J. H. Ullman's "Algorithm for Sub-graph Isomorphism," Journal of the Association for Computing Machinery, Vol 23, No 1, January 1976, pp 31-42 (incorporated herein by reference). The specific sub-graph method selected for matching a sub-graph in a first detection and data collection method's component relationship graph with a sub-graph in a second detection and data collection method's component relationship graph can vary depending on the application.

When a first component has been identified as a unique instance in two or more relationship graphs, any child components of the first component in the two or more relationship graphs can also be identified as being the same in both maps. For example, the network interfaces used to send the packets that were "sniffed" to form a second relationship graph can be matched with network interfaces discovered through an SNMP method to form a first relationship graph, the data from each discovery is merged or displayed together, and the network interfaces associated as sub-components of the identified unique component. This process can be repeated for any sub-components of those sub-components, until the component matching possibilities of the relationship graphs have been exhausted.

6.2.2.3 Data Merging

Identification of two apparently disparate components as being a single component (i.e. having a "self" relationship) permits managing the component object information and collected data of the two components as one. One approach to this is the merging of the data collected by the disparate detection and data collection methods. Such merging is performed by changing references in the persistent data store and in the data collection applications. In other exemplary embodiments merging is not performed in the data store but is performed by the user interface component and data is displayed. In alternative exemplary embodiments, data is not merged, but the existence of the "self" relationship between the discovered components serves as a link between the data for the two components.

When data and relationships from a first and a second detection and data collection method have been merged or linked, the resulting data and relationship information can be merged or linked with data and relationships from a third detection and data collection method in the same way, enabling consolidation of the views from all detection and data collection methods used by an RNMS.

6.2.2.4 Relationship-Based Discovery

In addition to the known detection and data collection methods for component discovery, such as those described previously, component relationships are used to improve further component discovery. When a first component has been discovered, possible relationships between the first component and various second components are determined using relationship rules. Detection and data collection methods appropriate for the discovery of a second component are employed to discover one or more second components based on the relationships specified by relationship rules. For example, when a web server is discovered, relationship rules for web servers are evaluated to determine the component types known to be related to web servers. These can include network servers, DBMS systems, PHP and Perl web server modules, and data storage arrays. Component detection and data collection methods capable of discovering each of these can then be employed to attempt discovery of these types of components. In some cases, such as discovery of a child component, for instance a blade server, it is certain that an associated parent component exists (e.g. a blade chassis). In cases where a parent component type is found it is likely, but not certain, that associated child components will be found. By using relationships as clues to the types of components that might exist, the component discovery efforts are targeted at components with a high likelihood of existing in a given network, and the need to look for other types of components is reduced or eliminated. This conserves resources such as CPU time, network bandwidth, and memory that would be required to execute a larger number of discovery modules, most of which would find nothing.

An example PDL of the logic performed by the CPU of the RNMS when a relationship association is established.

```
// check for further on endpoints using existing rules
FOREACH endpoint component in association DO
   Search for new rules match using endpoint component
   IF new rules match found
     THEN
        FOREACH rules that match selected component attributes DO
           IF association exists for current component that conforms to
           current rule
              THEN   // association found, is it current rule?
              IF current_rule age is newer than association age
                 THEN       // adjust current association if needed
                    Adjust association attributes to be consistent with rule
                    Set association age to now.
                    Throw association changed event
                    Continue
                 FI
              FI
              // association not found.
              Search for match endpoints under current rule
              IF match endpoints found
                 THEN
                    Add association for current rule
                    Perform any additional actions specified in rule
                    Continue
                 FI
              // no match endpoint found, do we discover one?
              IF discovery action found in rule
                 THEN
                    queue discovery for expected missing endpoint
                 FI
        ENDDO
     FI
ENDDO
```

6.2.2.5 Relationship-Based State Change Prediction

At least some relationships specify a dependency relationship between the related components. That is, a change in the state of a first component results in a change in the state of a second component. For example, if a first component fails, the existence, performance, connectivity, or other aspect of a second, related, component can be affected.

Relationship-based component management methods enables inter-detection and data collection method state change predictions. For example, if packet sniffing detects a reset on a TCP/IP connection, the determination that the connection being "sniffed" involves a specific component enables the prediction that the SNMP data for the component's connections will soon reflect the loss of that connection. By then checking the SNMP data for the component, this can be confirmed, and provides additional evidence that the component has been correctly identified from the two relationship graphs.

When a first detection and data collection method involves periodic polling to maintain current data for a component, but a second detection and data collection method does not, efficient use of resources can be enhanced by reducing or eliminating polling with the first detection and data collection method, and relying on the second detection and data collection method to detect component state changes. When such changes are detected by the second detection and data collection method, the first detection and data collection method can be invoked to collect and update data about the component.

6.2.2.6 Relationship-Based Event Processing

Processing of events occurs when one or more components change state and this state change is recorded by the RNMS. Event processing in some exemplary embodiments involves execution of one or more actions specified by event rules. Events and event processing in traditional NMS's is well understood. Event rules of traditional NMSes are modified in RNMS implementations to include relationship evaluation and potential additional data collection required to support relationship processing. In addition, events themselves may be a trigger event that causes relationships and relationship processing to be performed.

6.2.3 Non-Limiting Exemplary Implementations

6.2.3.1 Exemplary Processing

Figure 8:
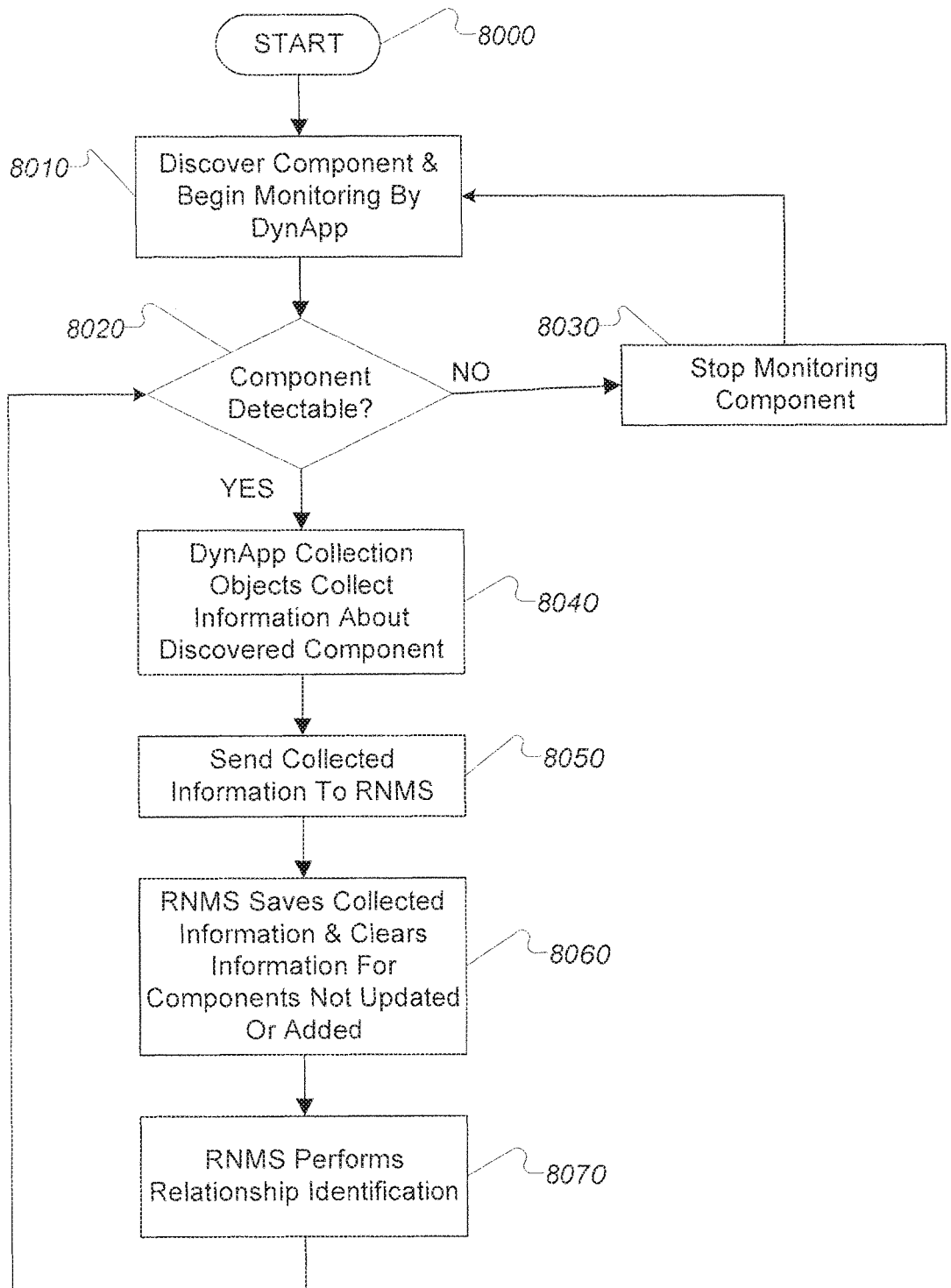
FIG. 8 is a flowchart of an exemplary embodiment component information collection process.

The flow chart of FIG. 8 illustrates RNMS processing involved in an exemplary non-limiting embodiment (8000). The process begins (8010) with a dynamic application discovering a component and instantiating collection objects to collect information about the component. In some cases discovery will result from use of various technologies to detect evidence of the component's existence (such as network traffic monitoring, probing network address/port combinations, reading log files, etc.), while in other cases discovery of the component will have been carried out by another dynamic application or by configuration data provided by a system operator. The discovered component is referred to herein as a "root component," and additional components discovered to be related to the root component may be associated with the root component by the data structure in a hierarchical relationship if the relationship rules in use specify this.

Regardless of the method by which the dynamic application obtains information about existence of its root component, the next step is to check to see if the component can be detected (8020). It is possible that the component may have been removed or otherwise disappeared since it was initially discovered (e.g. a VM may have been shut down, a hot-swappable hard drive may have been removed, and if it was a running application it may have exited). If the component is not detectable (8020), monitoring of the component is halted (8030) until and unless it is discovered or configured again (8010). If the component is detectable (8020) the dynamic application's instantiated collection objects collect information about the component (8040).

Collected information is stored by the RNMS in a component store (8050). The RNMS saves the collected information for detected components, and does not use previously saved information for components that are no longer detectable, retaining for use only those that whose information was updated or added in the current collection cycle (8060). Once collected information has been saved by the RNMS, and any deletions carried out (8060), the next step is to identify relationships between components (8070). The process described in FIG. 8 then continues with discovery of previously undiscovered components, monitoring of discovered components, and identification and recording of relationships between them.

6.2.3.2 Collection and Storage of RNMS Data Structures

Figure 9:
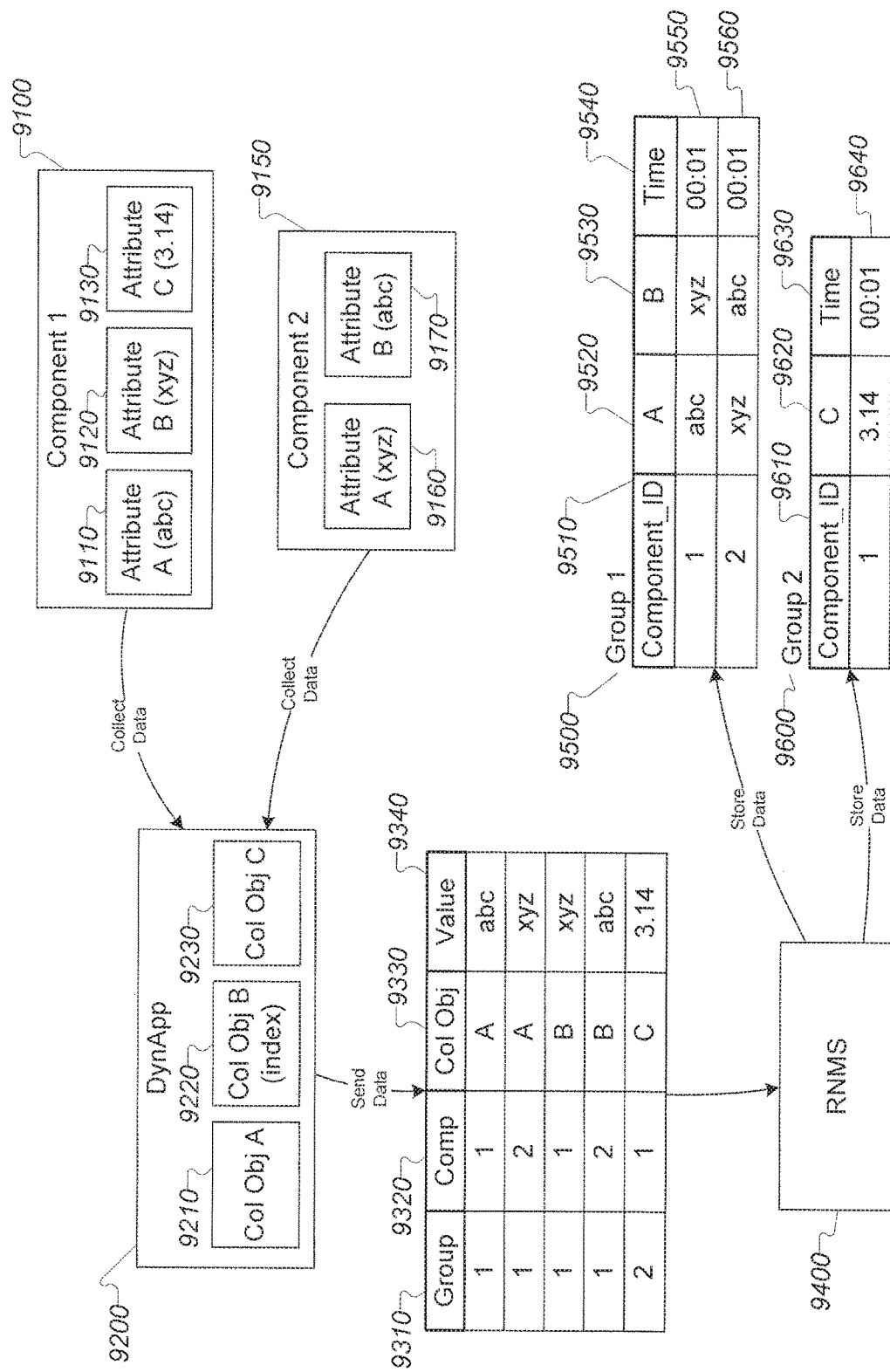
FIG. 9 is a diagram depicting an exemplary embodiment information collection and storage process.

FIG. 9 illustrates collection and storage of information by dynamic applications (9200) and their collection objects (9210, 9220, & 9230) in a non-limiting exemplary embodiment. A dynamic application instance (9200) is shown monitoring two components, Component 1 (9100) which has three attributes, Attribute A (9110), Attribute B (9120), and Attribute C (9130), and Component 2 (9150) which has two attributes, Attribute A (9160) and Attribute B (9170). The dynamic application instance (9200) comprises three collection object instances: Collection Object A (9210), which collects "A" attributes from components (9110 & 9160), Collection Object B (9220), which collects "B" attributes from components (9120 & 9170) and serves as the group index for Group 1, and Collection Object C (9230), which collects "C" attributes from components (9130).

The information supplied by the dynamic application's collection objects for each attribute collection includes Group ID (9310) from the Collection Object Instance (4500) data structure, Component_ID (9320) from the Component (4700) data structure for the component the dynamic application is collecting information from, Collection Object ID (9330) from the Collection Object Instance (4500) data structure, and the attribute value (9340) collected from the component (9100 or 9150) or synthesized by the collection object (9210, 9220, or 9230). Collection object A (9210) has collected a value of "abc" for attribute "A" of Component 1 (9110), and a value of "xyz" for attribute "A" of Component 2 (9160). Collection object B (9220) has collected a value of "xyz" for attribute "B" of Component 1 (9120), and a value of "abc" for attribute "B" of Component 2 (9170). Collection object C (9230) has collected a value of "3.14" for attribute "C" of Component 1 (9130), and nothing from Component 2 (9150), which has no attribute "C."

The information supplied by the collection objects (9310, 9320, 9330, & 9340) is sent to the RNMS (9400), which stores the information. Information can be stored in any format determined to be useful by those with skill in the art, such as relational database tables, an object oriented database, an in-memory data structure, associative memory, etc., but it is shown in table format in FIG. 9. Information is stored in tables by group, with information from a given group located in the same table, and information from other groups in other tables. Because the data sent by the dynamic application (9200) comprised Group 1 and Group 2 information, there are two tables shown (9500 & 9600). Each collection object's Value (9340) information is stored in a separate column of the appropriate group table, one each for Component_ID (9510 & 9610), Collection Object A (9520) values, Collection Object B (9530) values, and Collection Object C (9620) values. The values collected for a given component are stored as a single row in each table (9550, 9560 & 9640). Storage of collected information in this way makes it a simple matter to determine that the current value of Attribute "A" of Component 1 (9110) is "abc" and that this was true as of time 00:01. Likewise, it can easily be determined that Component 2 has no Attribute "C" as there is no row in the Group 2 table (9600) for Component 2. Determination of such information is needed for relationship rule evaluation as described below.

Figure 10:
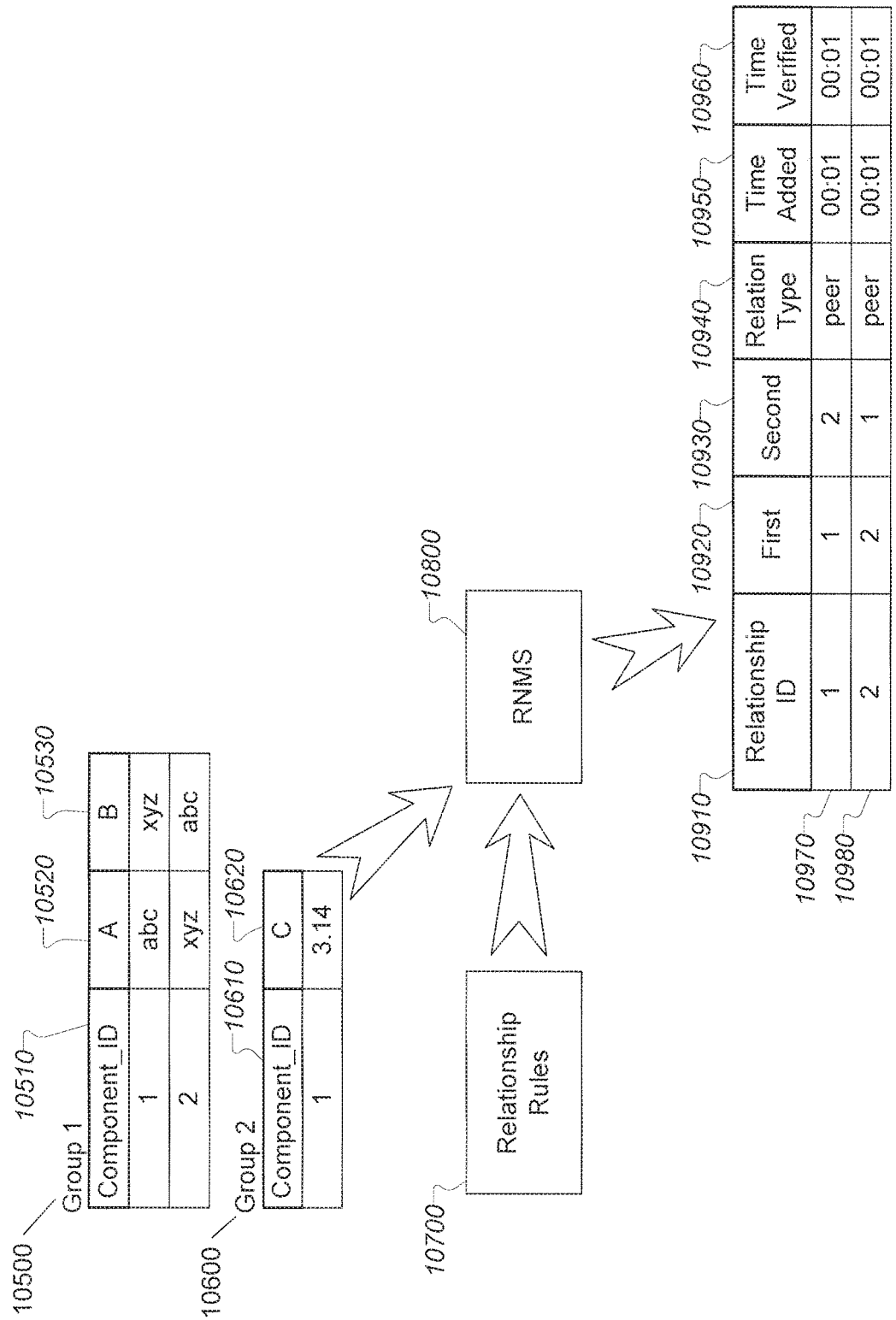
FIG. 10 is a diagram depicting exemplary embodiment collected information use in identifying and recording a relationship between two components.

6.2.3.3 Relationship Processing and Storage of Relationship Association Data Structures FIG. 10 illustrates relationship processing wherein the data stored as described above (10500 & 10600) is used by an RNMS (10800) along with Relationship Rules (10700), which can be stored in the form of Relationship Rule data structures (4300), to identify relationships between components. In the case of the data collected as described above, a single relationship is identified. Based on the collected information for Attribute "A" for Component 1 (9100) and attribute "B" for Component 2 (9150) matching exactly, and a Relationship Rule that defines matching Attribute "A" values for a first component, and Attribute "B" values for a second component as indicating a "peer" relationship, a Relationship data structure is created (10900), with an assigned Relationship ID of "1" (10910), a First_Component_ID of "1" (10920), a Second_Component_ID of "2", a Relationship_Type of "Peer" (10940), a Time Added of "00:01" (10950), and a Time Verified of "00:01" (10960). Relationship ID values are assigned sequentially in some exemplary embodiments. In alternative exemplary embodiments, Relationship ID values are constructed in diverse ways, such as by concatenating the Component_ID values of the components forming the relationship, using the Time Added value in conjunction with a sequential value, or by other means. The "peer" relationship indicates that Component 1 (9100) and Component 2 (9150) are interacting. For example, the Attribute "A" values may be local network port addresses, and Attribute "B" values may be remote network port addresses for an established network connection. The local port address for Component 1 (9100) matching the remote port address for a connection on Component 2 (9150) indicates that there is an established network connection between the components, and hence a peer relationship (10970) according to the rule set in use. In like manner, the rules and collected information also indicate a peer relationship in the other direction (10980) based on the local port address for Component 2 (9150) matching the remote port address for a connection on Component 1 (9100) and hence a peer relationship (10970) according to the rule set in use.

Figure 11:
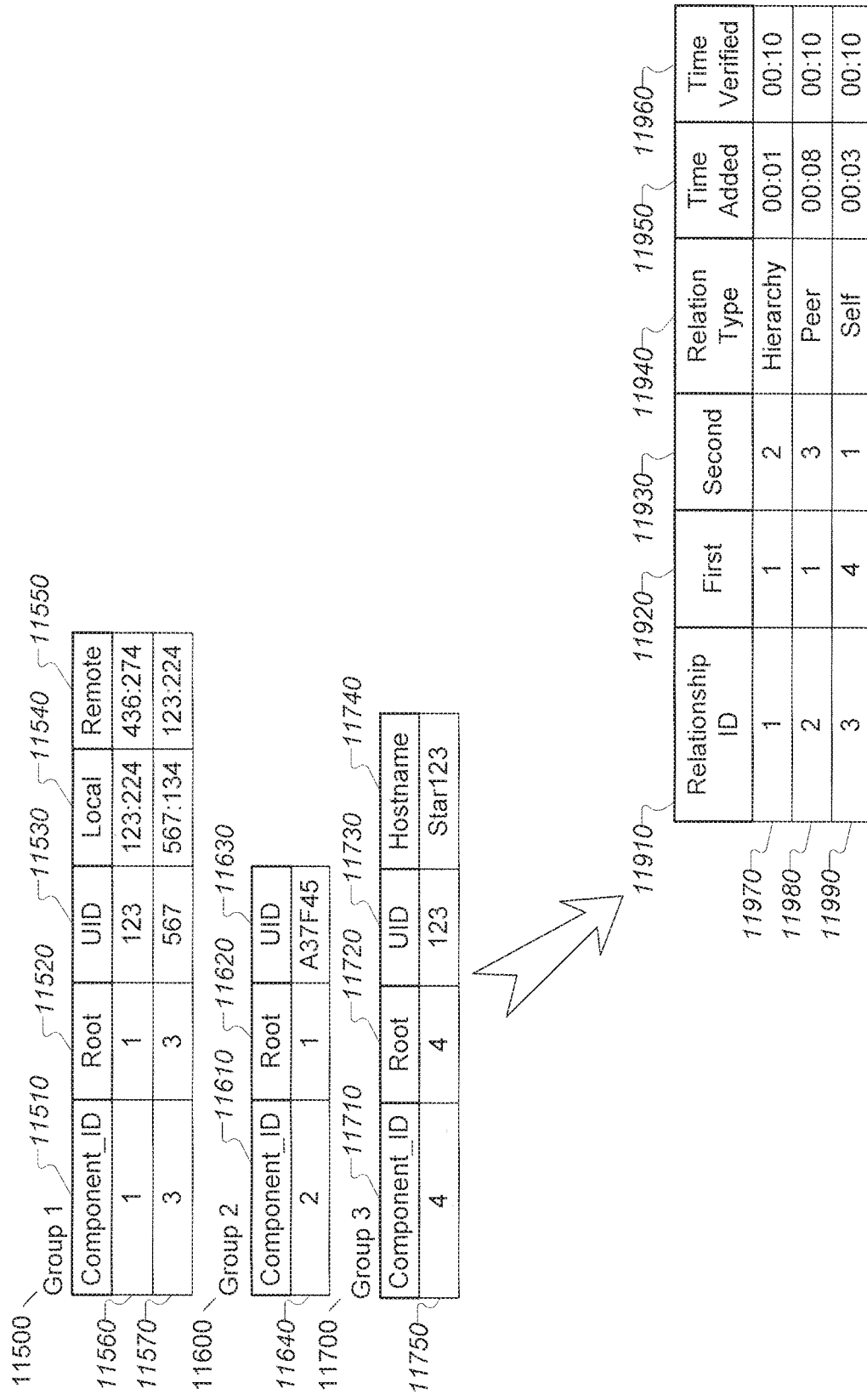
FIG. 11 is a diagram depicting exemplary embodiment collected information use in identifying and recording a plurality of relationships between components.

FIG. 11 illustrates another exemplary relationship processing scenario involving four detected components.

Attributes in Group 1 (11500) are collected by collection objects using a network traffic monitoring technology (commonly known as "packet sniffing"). Two components, Component 1 (11560) and Component 3 (11570), are being monitored in this way, with attributes for the root component ID (11520), a unique ID (11530) which is the network address value of the component, and two attributes having to do with an active network link: the local component address (11540), made up of the component's network address and a port number, and the address of the remote component that the network link is connected to (11550), also made up of the remote component's network address and remote port number. Both Component 1 and Component 3 are their own root components, indicating that they were discovered directly, not as part of discovery of a parent component. In this example, Component "1" is a server, and Component "3" is a workstation. In a typical embodiment there would be many more attributes collected for such components.

Attributes in Group 2 (11600) are collected using operating system API calls, and one component, Component_ID "2" (11640), is being monitored in this way. The component is a hard drive that is located as part of Component "1", as shown by the "Root" attribute (11620). A UID of "A37F45" (11630) has been collected or synthesized by the collection object responsible for the UID attribute.

Attributes in Group 3 (11700) are collected using the SNMP protocol. Component "4" (11750) is being monitored using this technology. As with Components "1" and "3," Component "4" is its own root (11720), and there is a UID attribute (11730) based on the network address of the component. A "Hostname" attribute (11740) is also collected, with a value of "Star123."

Processing of collected information using a rule set results in three relationships being identified (11970, 11980, & 11990).

Relationship_ID "1" (11970) is detected based on Component "2" having Component "1" as its root component. That is, Component "2" was discovered as part of the iterative discovery of Component "1", making Component "1" either the root for Component "2", or a peer of Component "2." The dynamic application carrying out at least part of the discovery was written for discovery of servers, and since typical servers have hard drives, had collection objects designed to discover hard drives and to collect hard drive attributes. Hard drives discovered during discovery of servers are considered child components of the server, hence the "Root" attribute of Component "2" (the hard drive) being the server, Component "1." A relationship rule specifying that a component with a Root attribute (11620) different from the Component_ID of the component (11610) is in a hierarchical relationship with the root component, and is the second component ("child") in the relationship results in the hierarchical relationship with Relationship_ID "1" (11970).

Relationship_ID "2" (11980) is detected based on Component "1" having its local address (11540) appearing as the Remote address (11550) of Component "3." This indicates that there is a network link from Component "3" to Component "1." The rule specifying that a matching Local (11540) and Remote (11550) address between two components indicates a "peer" relationship causes Relationship_ID "2" (11980) to be created with type (11940) "peer."

Relationship_ID "3" is detected based on the UID values of Component "1" (11560) and Component "4" (11750) matching exactly. There is a rule in the rule set in use in this example that specifies that two components with the same UID value are in a "self" relationship, or in other words, are the same component as seen by different technologies (in this case, packet sniffing and SNMP).

The relationship rule examples used here are not to be considered exhaustive. In some exemplary embodiments exact matches are not required for a rule to be applied. For example, "wildcard" matching, Boolean expressions, "preponderance of evidence," or other well understood methods can be used in at least some relationship rules to enable specification of broader matching requirements between attributes, or to enable more complex relationships between attributes before a rule is applied to identify a relationship; for example, to require that both UID and the component network address must match before a relationship can be identified so as to make the UID into a unique ID, or that two out of three specified pairs of attributes must match exactly for a relationship to be identified.

In some cases relationship rules can be designed to use component attributes derived from a plurality of technologies (i.e. different groups) and/or to identify more than one relationship. For example, a relationship rule can specify that if a server component has a network connection to a client component (as determined by an API), and a first host has a network connection to a second host, on which the server component is running (as determined by packet inspection), and the first host has a client process (as determined by OS service calls), then there is a peer relationship between the first host and the second host, and a peer relationship between the server component and the client component.

6.2.4 Example Relationship Detection

Figure 12:
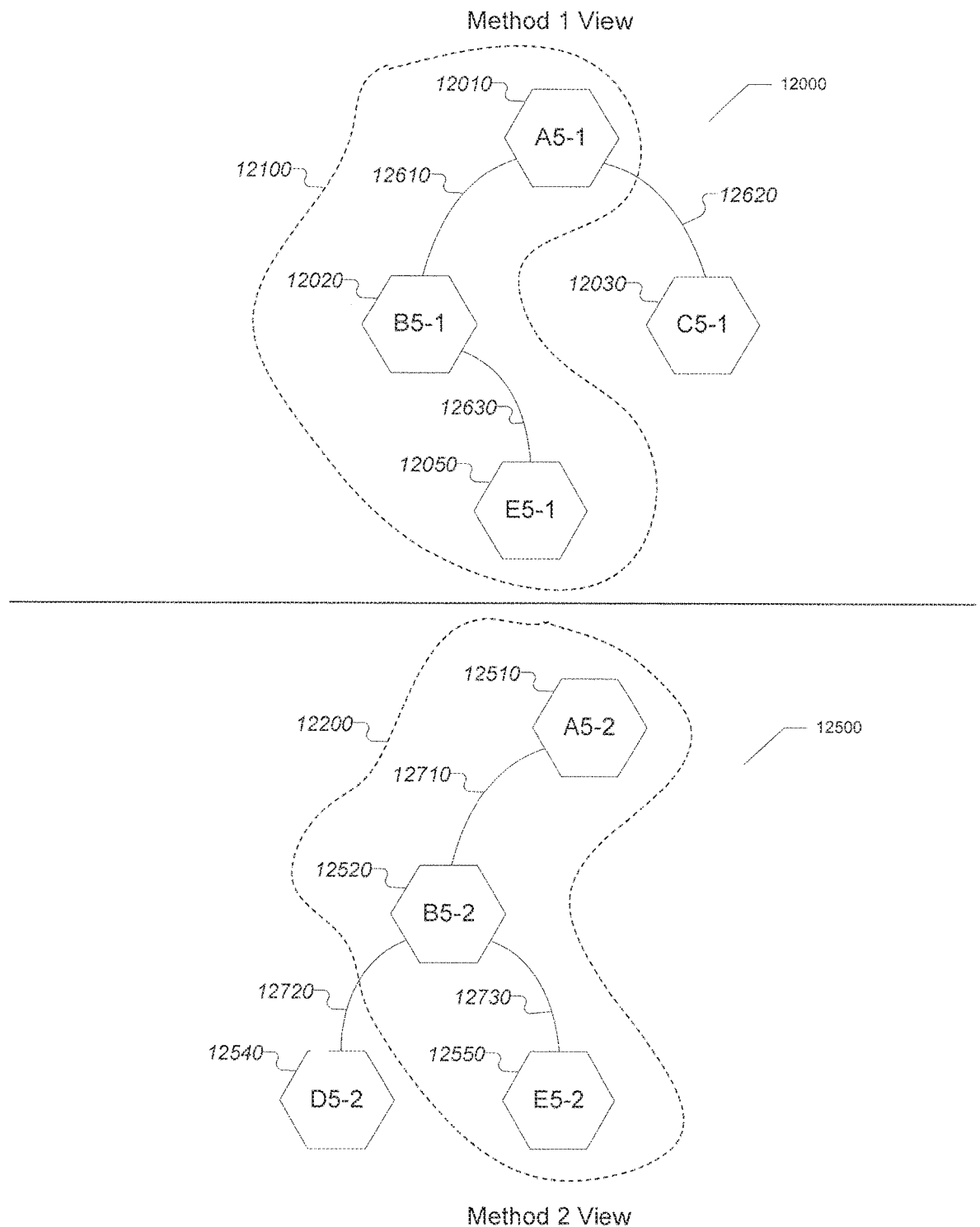
FIG. 12 depicts an exemplary schematic diagram of components discovered by two different detection and data collection methods.

As previously described, diverse detection and data collection methods can provide diverse information and have diverse capabilities for discovery of components. FIG. 12 shows two views of the same set of five components, referred to as A5, B5, C5, D5, and E5, as provided by a first detection and data collection method (12000) and a second detection and data collection method (12500). The first detection and data collection method has discovered components A5-1 (12010), B5-1 (12020), C5-1 (12030), and E5-1 (12050), but is incapable of detecting component D5. The second detection and data collection method (12500) has discovered components A5-2 (12510), B5-2 (12520), D5-2 (12540), and E5-2 (12550), but is incapable of discovering component C5. In other systems, these could appear to be up to 8 distinct components, when in reality there are five components.

Each detection and data collection method also has identified and recorded various relationships between the components it has discovered (12610-12630 & 12710-12730). By creating graphs of the relationships between components for each detection and data collection method, where components are the graph's nodes and relationships are the graph's edges, it is possible, using well understood graph theory methods, to detect a sub-graph in the first detection and data collection method graph (12100) that matches the pattern of a sub-graph in the second detection and data collection method graph (12200) and thus that components A5-1 (12010), B5-1 (12020), and E5-1 (12050) detected by the first detection and data collection method may be the same components as components A5-2 (12510), B5-2 (12520), and E5-2 (12550) discovered by the second detection and data collection method. Once such a potential matching has been identified, specific data about the components as provided by the first and second detection and data collection methods, or by a third detection and data collection method, can be used to confirm the component matching. For example, if the first detection and data collection method and the second detection and data collection method both provide a unique component ID value, this can be used to confirm the matching. If the first detection and data collection method shows network output counts that match network output counts shown by a second detection and data collection method, this can be used to confirm matching. In some exemplary embodiments only the relationship pattern match is required to confirm component matching. In alternative exemplary embodiments, at least one matching data item is required to confirm component matching. In yet other alternative exemplary embodiments a plurality of matching data items can be required, specific data item matching is required, or component matching requirements are specified by rules or functions. Confirmed component matching in this way enables automated elimination of component duplication and reduces the component count seen by the RNMS system to be closer to the correct component count. It also enables merging of the data collected by the various detection and data collection methods, or linking via "self" relationships, so as to permit a consolidated view of the components for use by the RNMS or its users.

Once the RNMS system has determined that component A5-1 (12010) and component A5-2 (12510) are one and the same, it can, in at least some scenarios and exemplary implementations, use the knowledge of the existence of component C5-1 (12030), detected using the first detection and data collection method, to enable the second detection and data collection method to detect, query, monitor, or probe C5-1 (12030), and provide additional information about C5-1 (12030) that the first detection and data collection method is not capable of collecting. In a system that cannot cross-correlate information from a plurality of diverse detection and data collection methods, the second detection and data collection method would not be able to do this, or not be able to do it efficiently, as it would have no information about the existence of component C5-1 (12030). For example, if the first detection and data collection method is packet sniffing, and the second detection and data collection method is port probing, the first detection and data collection method might scan a packet sent from component C5-1 (12030) and learn its network address. The second detection and data collection method, without access to this information, would have to probe, potentially, all possible addresses to learn of the existence of component C5-1 (12030), which is not desirable in most instances due to the resources such a process consumes (e.g. network bandwidth, processor time, etc.). With the information from the first detection and data collection method, however, the second detection and data collection method can probe the specific address of component C5-1 (12030) and learn, for example, what ports the component has open far more efficiently and quickly, and with much less impact on network throughput than would be the case with typically used detection and data collection methods.

Figure 13:
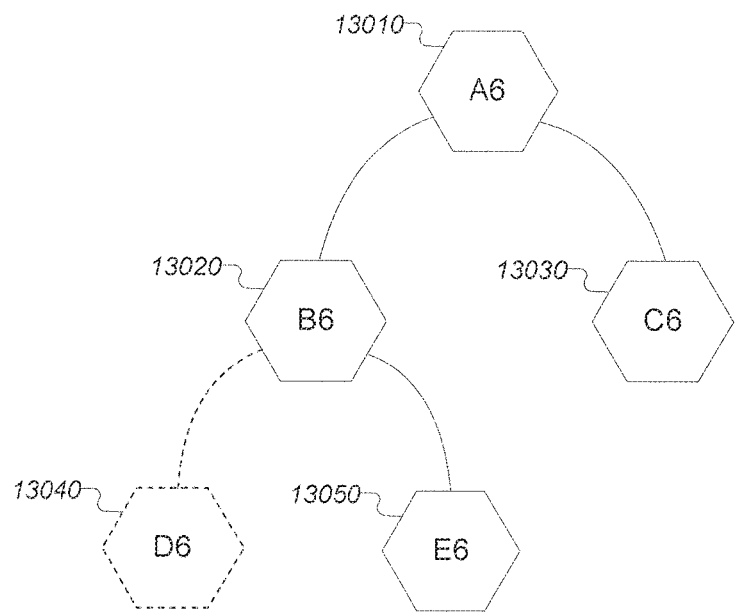
FIG. 13 depicts an exemplary schematic diagram of component discovery via use of relationships.

Knowledge of the relationships between components is also useful for efficient detection of components, even within a single detection and data collection method. FIG. 13 shows a set of components, A6 (13010), B6 (13020), C6 (13030), D6 (13040), and E6 (13050). A particular detection and data collection method has only managed to discover four of the five components: A6 (13010), B6 (13020), C6 (13030), and E6 13050). Component D6 (13040) has remained undetected by the particular detection and data collection method. If component B6 (13020) is of a type that typically has a relationship with a component of the type that is component D6 (13040), this can be used as a clue that component D6 (13040) may exist, and detection and data collection methods applicable to the type of component D6 (13040) can be employed to attempt to detect it. For example, if component B6 (13020) is a web service application of a type that typically stores data in a DBMS, and component E6 (13050), which is already known to be related to component B6 (13020), is not a DBMS, it is reasonable to guess that a DBMS component may be present, but currently undetected. Checking for open ports commonly used by DBMS systems, using OS APIs to look for DBMS processes, or by other well-known means, component D6 (13040) may be determined to be present and to be a DBMS. By using relationship information for clues, the detection attempts can focus on those detection and data collection methods most useful for detecting components of type D6 (13040), and detection and data collection methods not useful for this purpose can be omitted. This shortens the time required for the detection process, saves resources such as network bandwidth, CPU time, and memory, and improves the efficiency of the RNMS.

The use of relationships for detection of components, and the merging of component data provided by diverse detection and data collection methods can be synergistic in some exemplary embodiments. For example, in some scenarios an exemplary embodiment can detect a change in a component using a first detection and data collection method that results in a detection attempt using a second detection and data collection method that discovers a new component and identifies at least one of its relationships, which then prompts an update using a third detection and data collection method. For example, if a first component is a network-connected device with an open network port, and that open network port is determined, using a first detection and data collection method such as a software agent, to have received a connection request from a second system that was previously undetected, the RNMS can make use of a second detection and data collection method, such as packet sniffing, to determine the address of the second system, and then use a third detection and data collection method, such as SNMP, to learn more about the second system. Additional detection and data collection methods can be employed as needed as well, such as creating a software agent on the second system.

Relationships between components are also useful for prediction of component state changes. For example, if a web service has a relationship with a DBMS for storage of its data, and the DBMS has a relationship with a particular network connected device that it is running on, and the network connected is shut down, the relationships between these components permit prediction that the DBMS will become unavailable, and that the web service will also be affected. Such predictions can cross detection and data collection method boundaries. For example, a software agent might detect impending shutdown of the network connected device and report it to the RNMS, which uses identified and recorded relationship information to determine that the DBMS and web service will be affected, and then use port probing to determine that the DBMS does in fact go down. Such information based on identified relationships can be very useful to support staff when users ask why the web service is not responding. Rather than having to spend time and effort tracing back from the web service to determine the cause, the RNMS can, based on identified relationships between components, already have reported that the web service will be unavailable due to the DBMS being down due to the network connected device shutdown. In some exemplary embodiments, the RNMS and its identified relationships can be used to predict the results of at least some actions, such as shutdown of a network connected device, prior to implementing them. This can enable avoidance of unexpected side-effects, and therefore improve the efficiency and reliability of the network.

In some exemplary embodiments, component state changes can be used to trigger actions such as e-mail notifications, SMS text message sending, configuration changes in managed components, logging system entries, execution of specified software applications, etc. Such state changes are referred to herein as "events." The actions to be taken, and the events that trigger them, can be specified by event rules. Event rules that specify a given trigger event can be evaluated when the event is detected, and if the rule requires the specified action be taken, the action specified can be executed. Event rules can specify trigger events in combination with other factors, such as time of day, day of week, month, date, location of event, component or components involved in the event, type of state change the component or components have undergone, relationships or relationship types that the component is a part of, or other factors deemed appropriate by those with skill in the art.

Identification of component relationships can be accomplished in at least some exemplary embodiments by the use of relationship rules. Relationship rules specify one or more requirements to be met for a relationship to exist between two or more components. For example, rules might specify that a first component must have an open network port, that a second component must have a connection to the first component's network port, and that the transmit count for the second component's connection must be the same as or greater than the receive count for the first component's network port. If all of these requirements are met, then a relationship between the components has been identified. Relationship rules can specify any number of requirements, and the requirements can comprise any values that can be collected using any available detection and data collection method. In at least some exemplary embodiments, relationship rule evaluation results in a Boolean value useful for specifying whether a relationship exists, or does not exist. In some alternative exemplary embodiments, relationship rule evaluation results in a probability value that specifies the likelihood that a relationship exists. In at least some of these alternative exemplary embodiments, evaluation of a plurality of such relationship rules results in a plurality of probabilities that are combined and the result of the combination is compared to a threshold to determine whether a relationship exists. Relationship rules can also specify the type of relationship they define (hierarchical, peer-to-peer, or self), and in some exemplary embodiments optionally specify relationship attributes for the relationship.

6.2.5 Detection and Association of a Server with a Backing NAS Device

For example, a server device that has a file open for reading on a NAS device will also have a network connection to the NAS device. A detection and data collection method that detects files accessed on the NAS device, such as a detection and data collection method that uses a NAS API to collect data, will show that there is a file access relationship between the NAS device and the server. A detection and data collection method that detects network traffic between devices, such as packet sniffing, will show that there is a network connection relationship between the NAS device and the server. By determining the relationships between all detected components for each detection and data collection method, and comparing patterns of relationships as viewed by each detection and data collection method, components as viewed by diverse detection and data collection methods can be matched and duplication of components as seen by a RNMS that uses the diverse detection and data collection methods can be reduced or eliminated. Methods for determination of the relationships existing between detected components for each detection and data collection method are needed.

6.2.6 Storage Infrastructure Problem Resolution

A Windows OS virtual guest VM is using storage via a network storage device. The Windows OS is experiencing poor performance, which is tracked to slow I/O response from network data storage. Using automatically constructed and maintained relationship graphs, operations staff is able to quickly determine that the network storage is provided via a NetApp appliance. Using the relationship graphs, staff navigates through the network topology to the specific network storage device being used by the Windows OS VM. Again using the relationship graphs, the operations staff is able to identify and check other network connected devices that are using the same network storage device. Operations staff finds that a Linux computer has a high rate of I/O that is saturating the network storage device and causing other users of the network storage device to experience poor performance. Operations staff then uses the RNMS to command the Linux computer to stop the problem application that is causing the high rate of I/O.

Alternatively, the RNMS detects the high rate of I/O on the NetApp data volume, the high rate of I/O on the Linux VM that is using the NetApp data volume, and associates the two such that the root cause (i.e. the high rate of I/O from the Linux VM) is addressed first. Related alarms for other network connected devices affected by the problem can be related to the Linux VM problem and noted as such in any alarms that are delivered to prevent operations staff from spending time investigating a problem that has already been resolved.

6.2.7 "Tree Merge"

In this example, a Cisco Unified Computing System (UCS) infrastructure has been discovered via two detection and data collection methods that results in the UCS Chassis being "duplicated" as two different components: one as a component device under the UCS Manager and one as a root device UCS Chassis. The data collected via UCS Manager is not as robust as that collected via UCS Chassis. However, the user does not wish to have the UCS Chassis represented in duplicate. They would like to see a merged component representation of the UCS Chassis under UCS Manager with the root device UCS Chassis data. Any child components of the two components should also be merged when it is determined that they are the same components. The final merged UCS chassis device data is a union of the sets of data collected for the original duplicate components and any data that is collected for both in future.

Table 2 shows a conceptual merge.

| Before | Relationship Before | After | Relationship After |
|---|---|---|---|
| UCSManager | root | UCSManager | root |
| UCSChassisA | child of UCSManager | UCSChassisAuB | child of UCSManager |
| UCSChassisB | root | | |
| UCS_CA_SA | child of UCSChassisA | UCS_CAuB_SA | child of UCSChassisAuB |
| UCS_CA_SB | child of UCSChassisA | UCS_CAuB_SB | child of UCSChassisAuB |
| UCS_CA_SC | child of UCSChassisA | UCS_CAuB_SC | child of UCSChassisAuB |
| UCS_CB_SA | child of UCSChassisB | | |
| UCS_CB_SC | child of UCSChassisB | | |

6.2.8 Staff Notifications

An RNMS has detected through evaluation of e-mail traffic, network file system operations, and file system discovery methods, that a user with the e-mail address "bob@company.com" has stored copies of e-mails in a network file directory with the path "bob@NFS1:/home/bob/oldmail," which is owned by user "bob." The RNMS has established a relationship model involving relationships between user "bob," the e-mail address "bob@company.com," and the "oldmail" network file directory, as well as between the "oldmail" directory and the "NFS1" network file server component.

When the RNMS detects through one or more detection and data collection methods that the NFS1 file server component has become unavailable, it checks its event rules for rules with trigger conditions involving the NFS1 file server (since that is the component that changed state), becoming unavailable (since that is the state it changed to), and the "oldmail" directory (due to its relationship with the NFS1 file server). Relationship checking is limited to direct relationships in this case, by RNMS configuration settings, so no other relationships are involved at this point. The relevant event rules found are evaluated and their actions carried out if the evaluations indicate a requirement to do so. One of the event rules requires that users related to a network file server type of component be notified when the component becomes unavailable. Since NFS1 is a file server type of component, and it has become unavailable, this event rule is triggered and notification is required.

In order to perform the action of notifying users of NFS1 about its unavailability, the RNMS uses relationship information to determine which users are users of NFS1 (i.e. which users have files stored on NFS1) and the component "bob" is determined to have such a relationship with the NFS1 component and to be a user type of component. To notify user "bob," the RNMS looks for a relationship between "bob" and a component of a type useful for notification purposes. The RNMS finds that the e-mail address component "bob@company.com" is related to the user component "bob," and is of a type useful for notification purposes. The e-mail address component and the notification message are passed to a notification module in the RNMS, which recognizes the e-mail address component as an e-mail address and uses SMTP (Simple Mail Transport Protocol) to send the notification message.

It will be recognized by those skilled in the art that, while the invention has been described above in terms of preferred embodiments, it is not limited thereto. Various features and aspects described above may be used individually or jointly or in any combination. Further, although the technology herein has been described in the context of its implementation in a particular environment, and for particular applications (e.g. an RNMS), those skilled in the art will recognize that its usefulness is not limited thereto and that the technology can be beneficially utilized in any number of environments and implementations where it is desirable to detect components using disparate detection methods and correlate the results to identify instances of the same detected component from the disparate detection methods, collect data about components using disparate data collection methods and correlate or merge the data from the disparate data collection methods, determine relationships between detected components, and use the determined relationships to discover additional components, determine optimal detection and data collection methods for discovering or collecting data about the additional components, or to predict component state changes based on state changes in other components. Accordingly, while the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A network management system comprising:
   at least one discovery device connected to a digital network, the at least one discovery device comprising a processor, a network communication device and storage coupled to the processor, the at least one discovery device configured to use a first discovery method and a second discovery method different from the first method to discover information for devices connected to the network and to store said discovered information in the storage; and
   an associating processor operatively coupled to the discovered information stored by the at least one discovery device, the associating processor using a rule template to determine whether discovered information stored by the at least one discovery device based on the first and second discovery methods are for related network-connected devices, the associating processor recording an association between the first method discovery information and the second method discovery information.

2. The system of claim 1 wherein the at least one discovery device comprises first and second network-connected discovery processors, the first network-connected discovery processor being configured to perform the first discovery method, the second network-connected discovery processor being configured to perform the second discovery method.

3. The system of claim 1 wherein the associating processor and the at least one discovery device are provided by the same hardware.

4. The system of claim 1 wherein the associating processor and the at least one discovery device are provided on different hardware.

5. A network management machine comprising:
   first and second discovery devices connected to a digital network, the first and second discovery devices each comprising a processor, a network communication device and storage coupled to the processor, the first and second discovery devices each configured to discover information for devices connected to the network and to store said discovered information in the storage; and
   an associating processor operatively coupled to receive the discovered information stored by each of the first and second discovery devices, the associating processor using a rule template to determine whether discovered information stored by the first discovery device and discovered information stored by the second discovery device are for related network-connected devices, the associating processor recording an association between the discovered information stored by the first discovery device and the discovered information stored by the second discovery device.

6. The machine of claim 5 wherein the first discovery device discovers a first component using a first discovery method and discovers a second component using a second discovery method; and the associating processor determines a relationship between the first and second components.

7. The machine of claim 5 wherein the associating processor is further configured to merge the discovered information stored by the first discovery device and the discovered information stored by the second discovery device into a single unified view.

8. The machine of claim 7 wherein the merging associating processor changes data collection the first and second discovery devices use for collecting and/or storing the discovered information.

9. The machine of claim 5 wherein the first and second discovery devices each identify state changes in network-connected devices, and the associating processor adjusts the state of a discovered second component object to reflect the state change of a discovered first component object and the nature of the relationship between the first and second component objects.

10. The machine of claim 9 wherein the associating processor adjusts the state by suppressing alerts and/or notifications of the state of the second component object.

11. The machine of claim 9 wherein the associating processor adjusts the state by iteratively adjusting the state of other associated objects beyond the first and second objects on the basis of their relationships with either the first or second object.

* * * * *